US010721430B2

(12) United States Patent
Oh et al.

(10) Patent No.: US 10,721,430 B2
(45) Date of Patent: Jul. 21, 2020

(54) DISPLAY DEVICE AND METHOD OF OPERATING THE SAME

(71) Applicant: LG ELECTRONICS INC., Seoul (KR)

(72) Inventors: Hyojung Oh, Seoul (KR); Seunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 15/291,770

(22) Filed: Oct. 12, 2016

(65) Prior Publication Data

US 2017/0272681 A1     Sep. 21, 2017

(30) Foreign Application Priority Data

Mar. 16, 2016    (KR) ........................ 10-2016-0031467

(51) Int. Cl.
    *G06F 3/048*      (2013.01)
    *H04N 5/44*       (2011.01)
    (Continued)

(52) U.S. Cl.
    CPC ........... *H04N 5/4403* (2013.01); *G08C 17/02* (2013.01); *H04N 5/44582* (2013.01);
    (Continued)

(58) Field of Classification Search
    CPC .... G06F 3/017; G06F 3/0346; G06F 3/04817; G06F 3/04886; G06F 17/30017; G06F 1/1694; G06F 2200/1637; G06F 2203/04803; G06F 3/033; G06F 3/0481; G06F 3/0485; G06F 3/1423; H04N 5/4403; H04N 5/445; H04N 21/42; H04N 21/44
See application file for complete search history.

(56) References Cited

U.S. PATENT DOCUMENTS 8,769,598 B2 *   7/2014   Darbee ................... G06F 3/147
                                                              348/734
9,807,446 B2 *   10/2017   Sirpal ..................... G06F 3/017
(Continued)

FOREIGN PATENT DOCUMENTS

CN      104717564 A     6/2015
CN      105049908 A     11/2015
(Continued)

OTHER PUBLICATIONS

"Verizon Fios to Clip Off YouTube", published: Apr. 15, 2013, publisher: Variety, pp. 1-2 (Year: 2013).*
(Continued)

*Primary Examiner* — Wilson W Tsui
(74) *Attorney, Agent, or Firm* — KED & Associates LLP

(57) ABSTRACT

A display device includes a display unit configured to display a plurality of pieces of content received from a plurality of source devices connected to the display device; and a control unit configured to receive a control activation request for a first source device of the plurality of source devices from a remote control device, activate control of the first source device in response to the received control activation request, and control an operation of the first source device in response to the signal received from the remote control device.

14 Claims, 50 Drawing Sheets

(51) Int. Cl.
  *H04N 5/445* (2011.01)
  *H04N 21/422* (2011.01)
  *H04N 21/443* (2011.01)
  *H04N 21/41* (2011.01)
  *H04N 21/4363* (2011.01)
  *H04N 21/462* (2011.01)
  *H04N 21/472* (2011.01)
  *H04N 21/482* (2011.01)
  *H04N 21/436* (2011.01)
  *G08C 17/02* (2006.01)

(52) U.S. Cl.
  CPC ..... *H04N 5/44591* (2013.01); *H04N 21/4126* (2013.01); *H04N 21/4221* (2013.01); *H04N 21/42207* (2013.01); *H04N 21/42222* (2013.01); *H04N 21/42225* (2013.01); *H04N 21/43615* (2013.01); *H04N 21/43637* (2013.01); *H04N 21/443* (2013.01); *H04N 21/4622* (2013.01); *H04N 21/472* (2013.01); *H04N 21/482* (2013.01); *G08C 2201/30* (2013.01); *H04N 21/42224* (2013.01)

(56) References Cited

U.S. PATENT DOCUMENTS

| | | | |
|---|---|---|---|
| 2003/0071855 A1* | 4/2003 | Kim | G06F 3/03547 715/810 |
| 2010/0037180 A1* | 2/2010 | Elias | G06F 3/04886 715/840 |
| 2010/0180304 A1* | 7/2010 | Hassell | H04N 5/44591 725/44 |
| 2011/0035668 A1* | 2/2011 | Thiyagarajan | H04N 5/4403 715/716 |
| 2011/0119621 A1* | 5/2011 | Cho | H04N 5/44591 715/788 |
| 2012/0120316 A1* | 5/2012 | Lee | H04N 21/42204 348/564 |
| 2012/0262370 A1* | 10/2012 | Ko | G06F 3/03547 345/157 |
| 2012/0274863 A1* | 11/2012 | Chardon | G06F 17/30011 348/734 |
| 2013/0088332 A1* | 4/2013 | Park | H04N 21/4126 340/10.1 |
| 2013/0169574 A1 | 7/2013 | Suh et al. | |
| 2014/0362293 A1 | 12/2014 | Bakar et al. | |
| 2015/0067729 A1* | 3/2015 | Yoon | G06F 3/0482 725/37 |
| 2015/0172767 A1 | 6/2015 | Park et al. | |
| 2015/0237290 A1* | 8/2015 | Lee | H04N 5/44591 348/570 |
| 2015/0301777 A1 | 10/2015 | Jang | |
| 2016/0006864 A1 | 1/2016 | Park et al. | |

FOREIGN PATENT DOCUMENTS

| | | |
|---|---|---|
| KR | 10-2002-0080538 | 10/2002 |
| KR | 10-2010-0058334 | 6/2010 |
| KR | 10-2011-0058079 | 6/2011 |
| KR | 10-2015-0121915 | 10/2015 |

OTHER PUBLICATIONS

International Search Report dated Jan. 11, 2017 issued in Application No. PCT/KR2016/010630.
Extended European Search Report dated Jun. 26, 2019 issued in Application 16894671.3.
Chinese Office Action dated Apr. 27, 2020 issued in Application 201680085140.0.

* cited by examiner

FIG. 8C
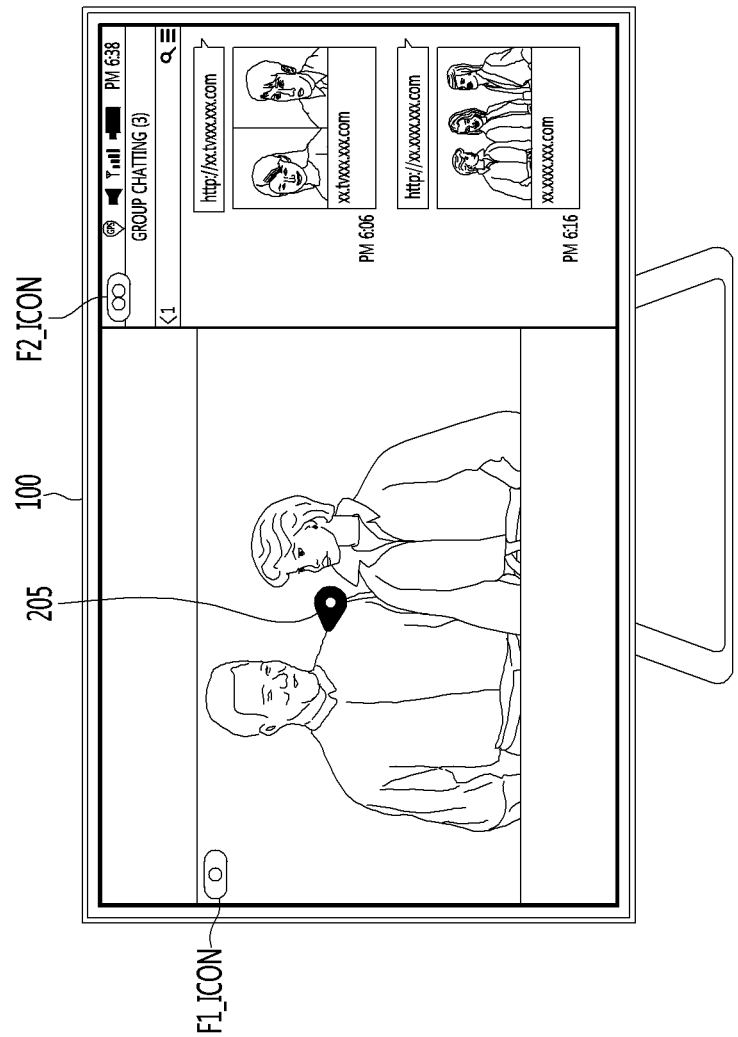
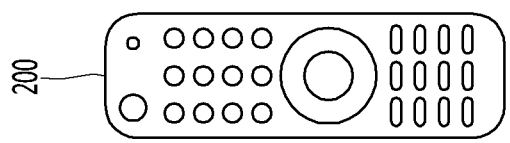

FIG. 9C
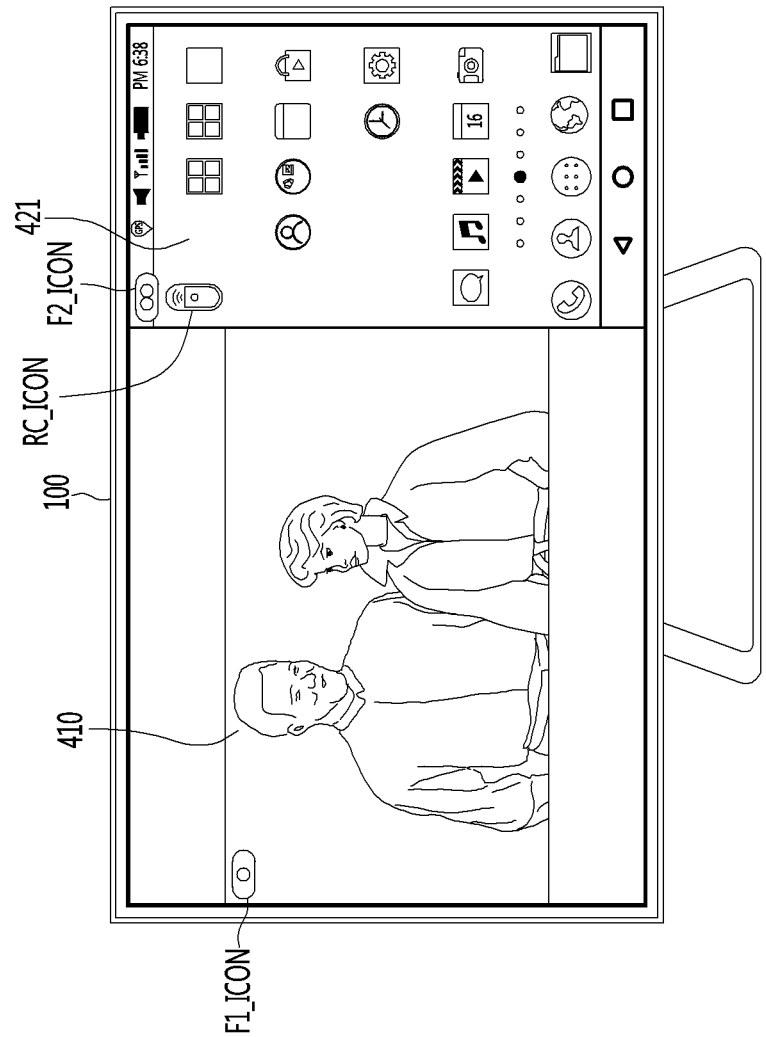
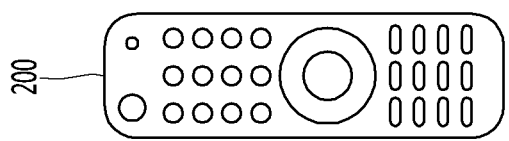

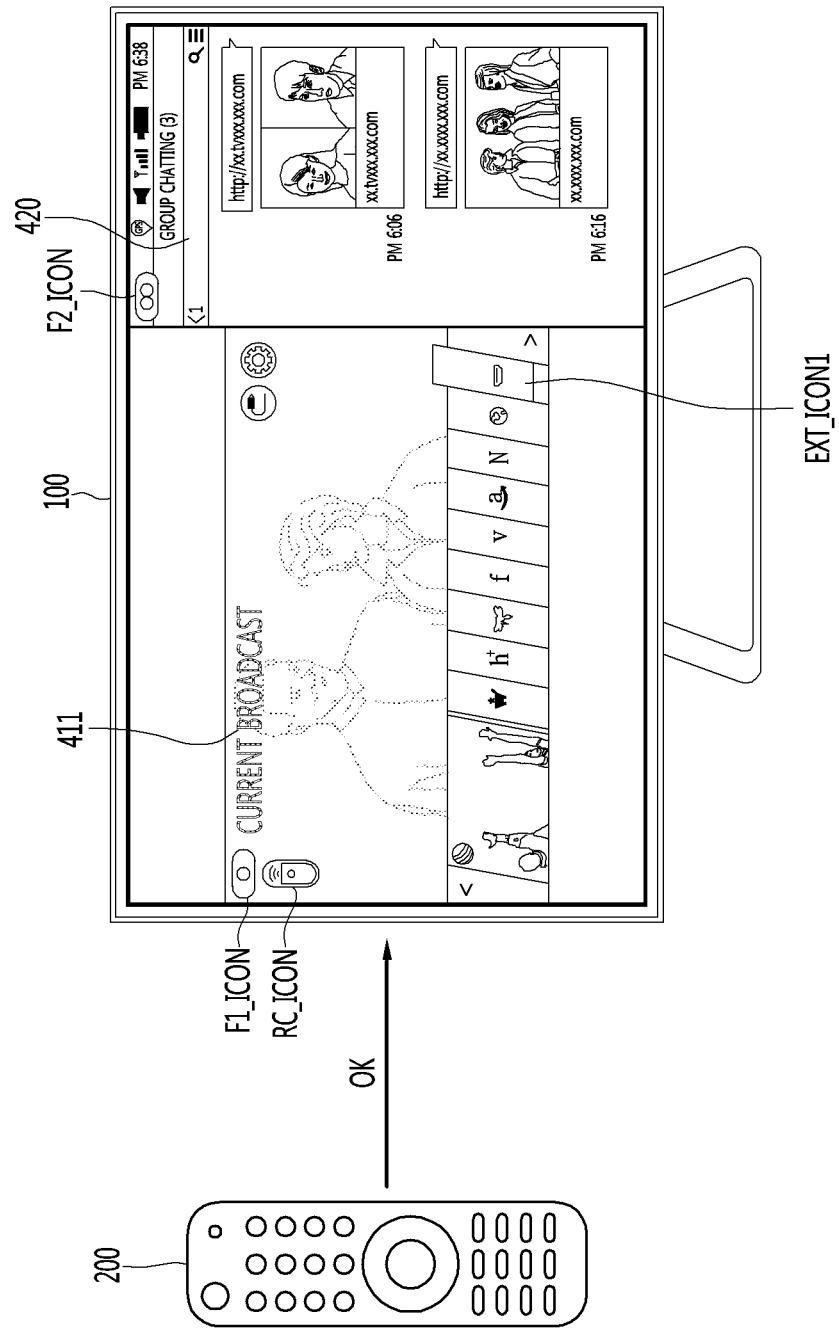

FIG. 10B
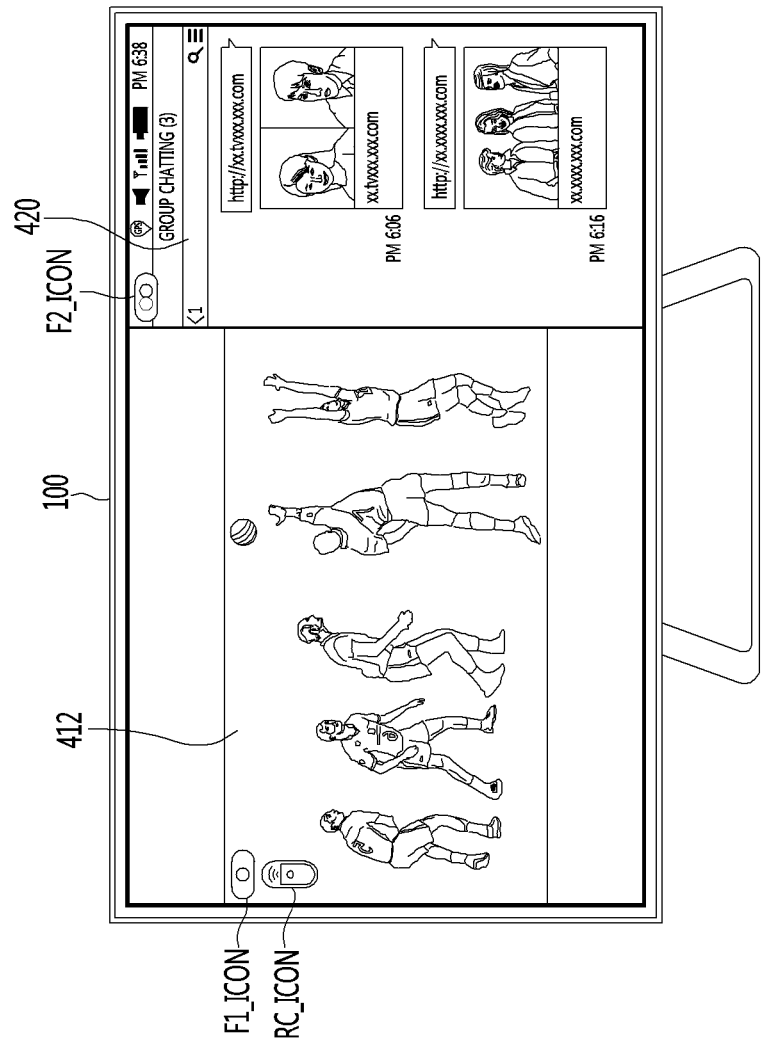
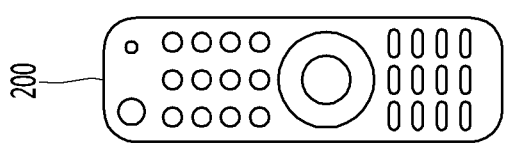

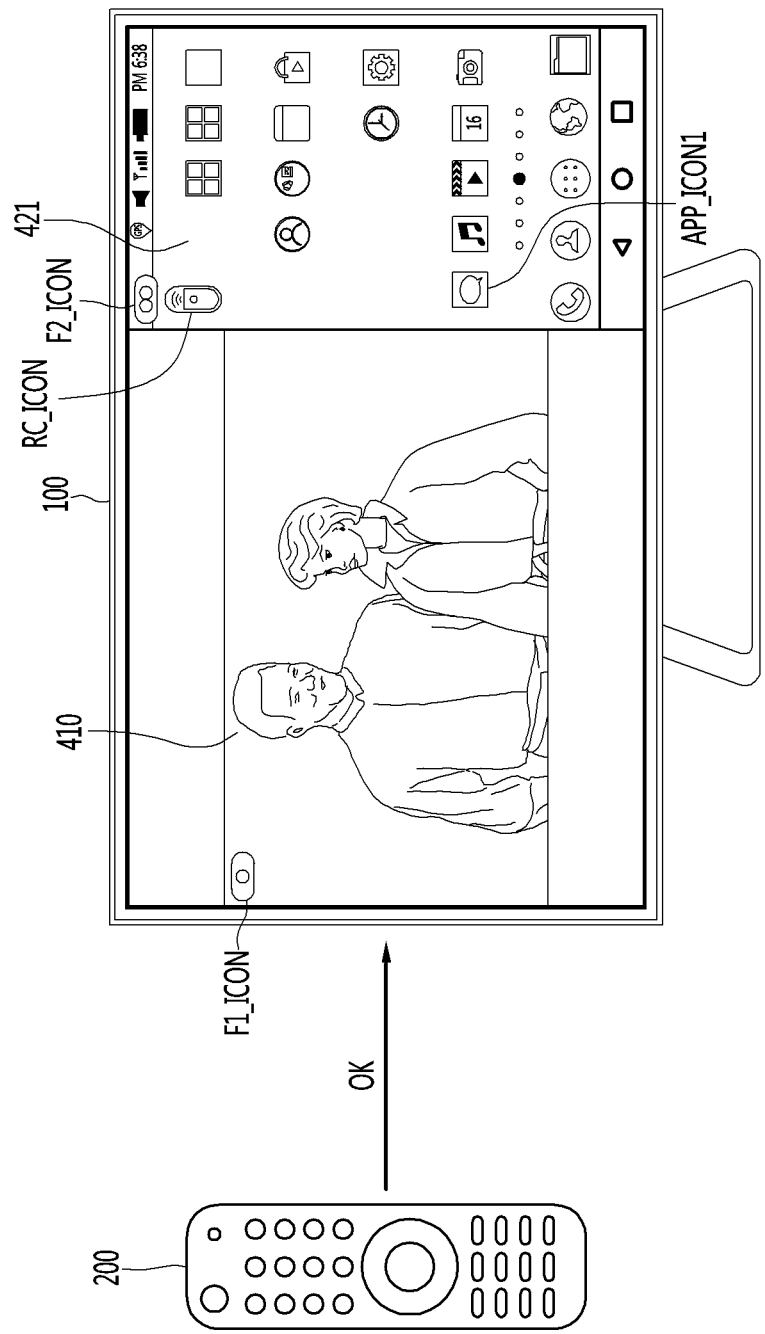

FIG. 11C
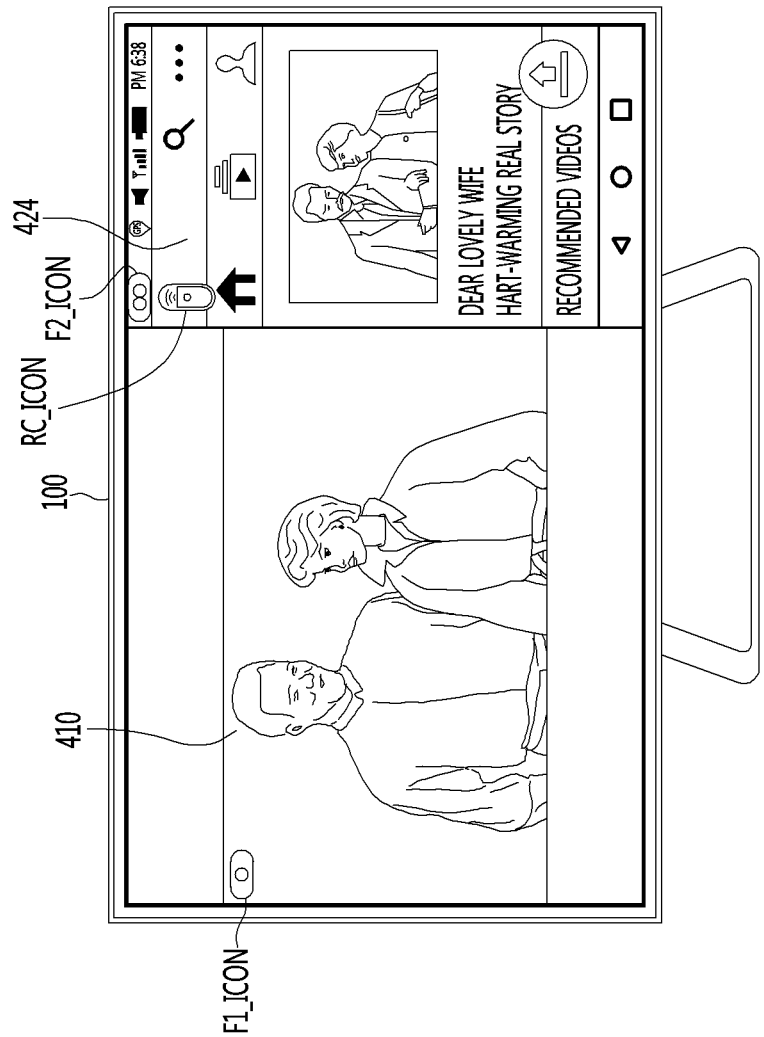
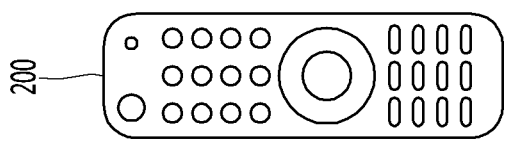

FIG. 12B
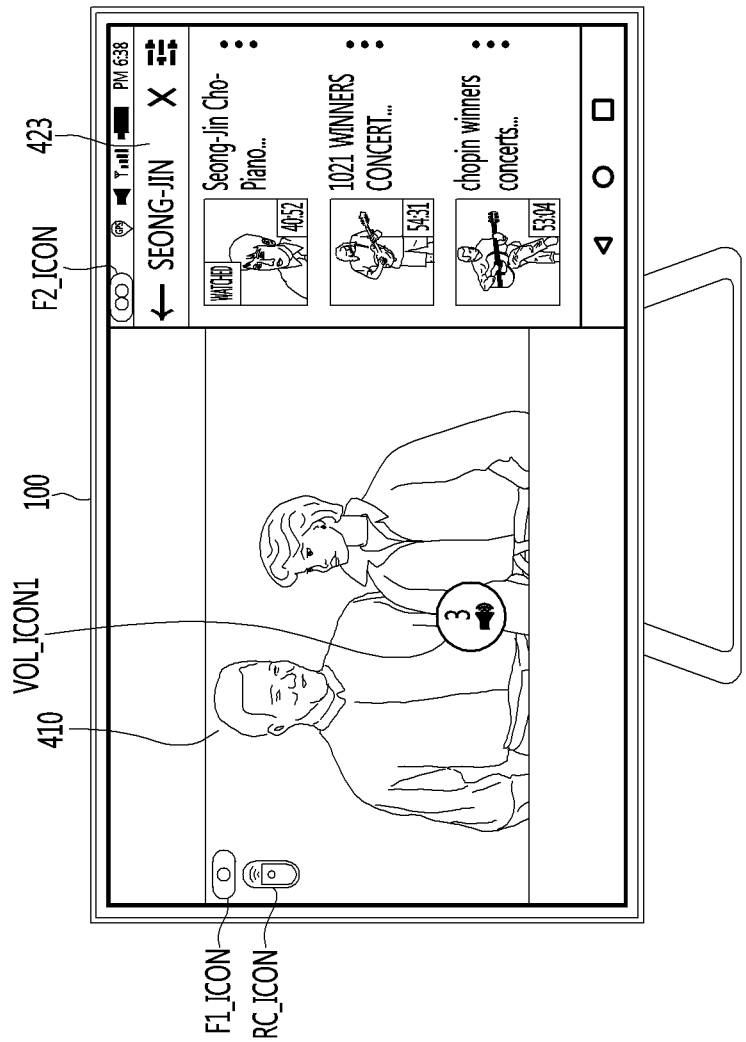
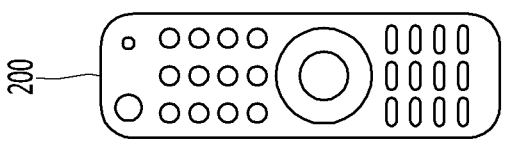

FIG. 12C
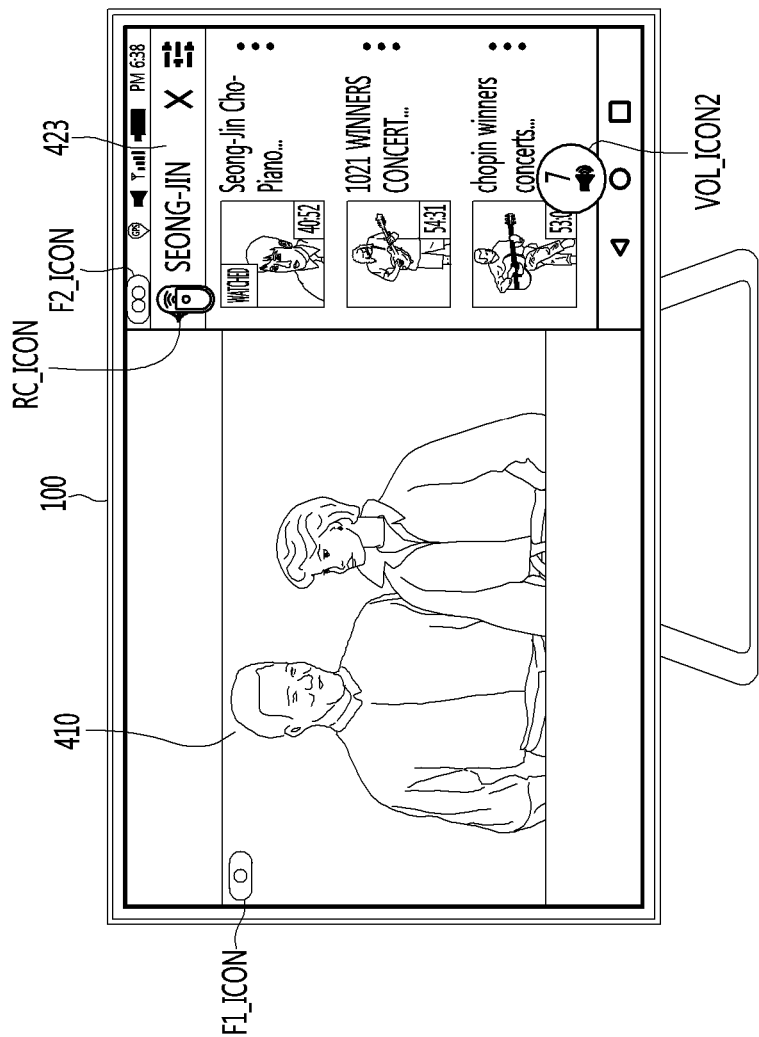
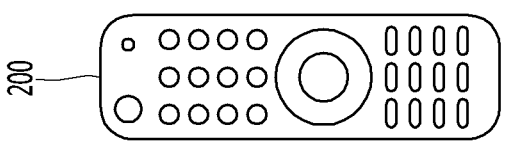

FIG. 13B
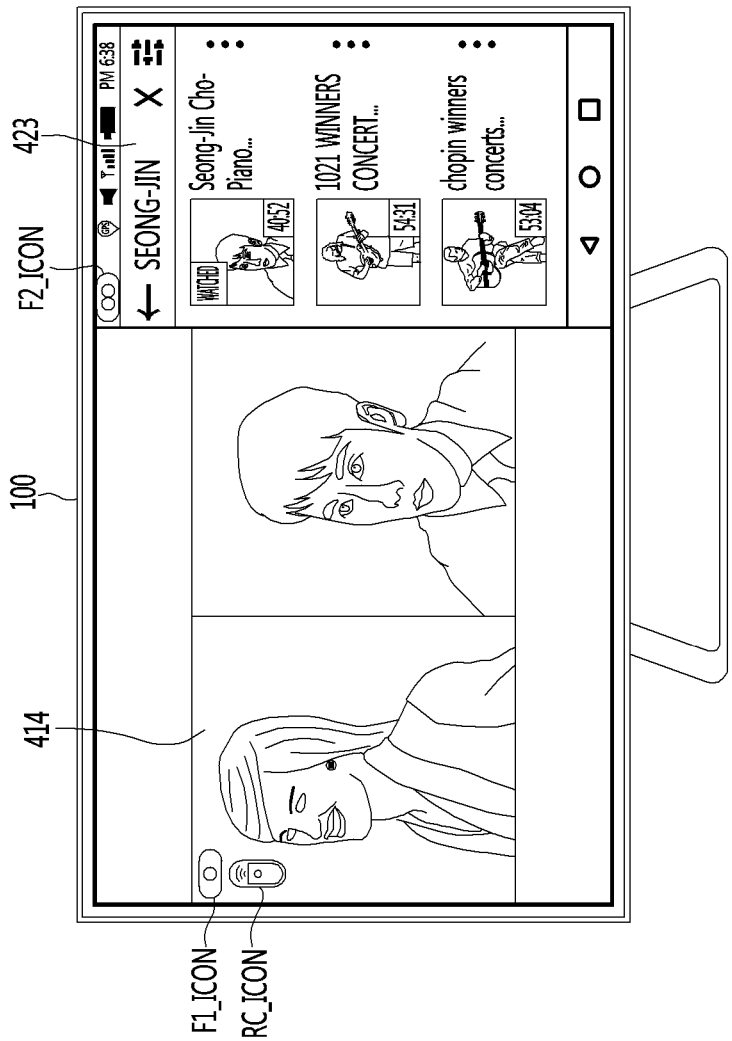
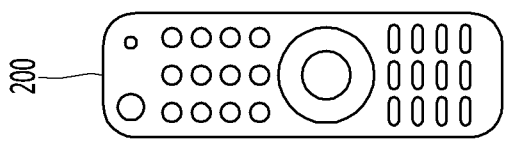

FIG. 15B
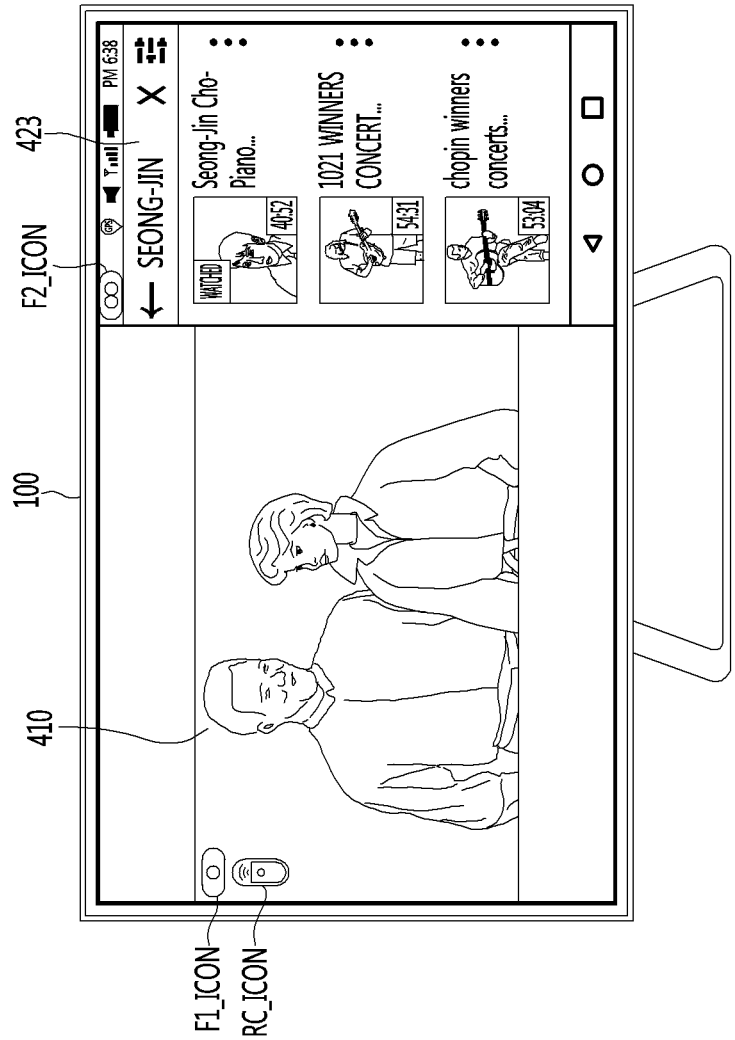
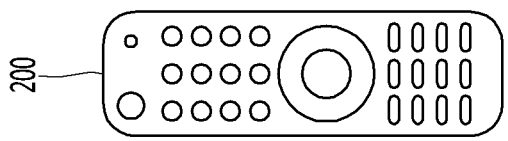

FIG. 15D
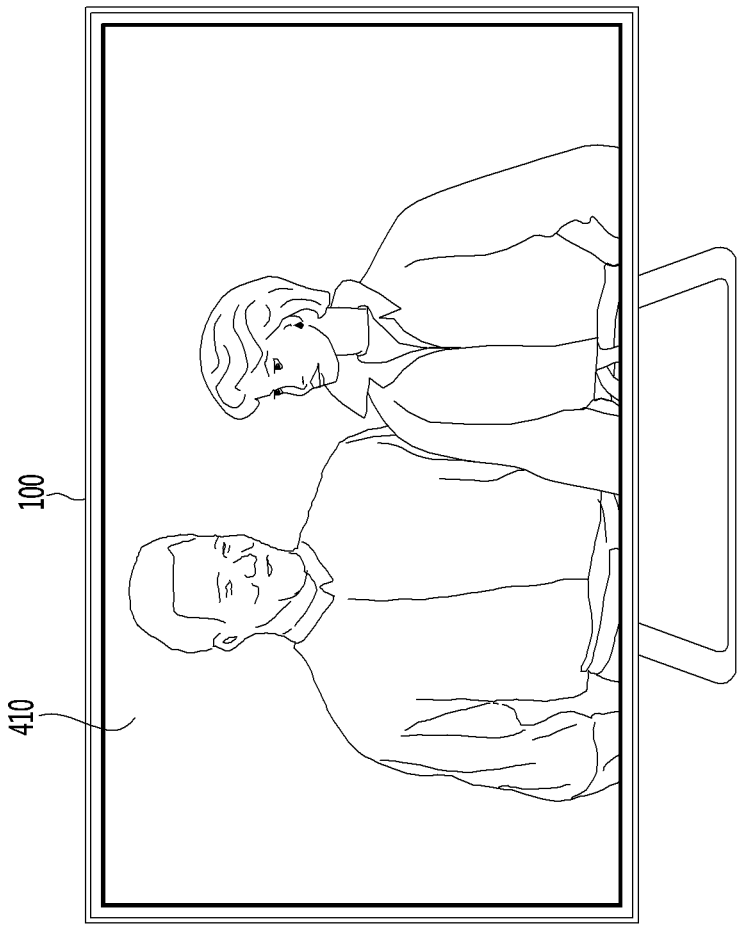
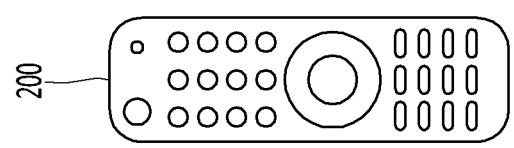

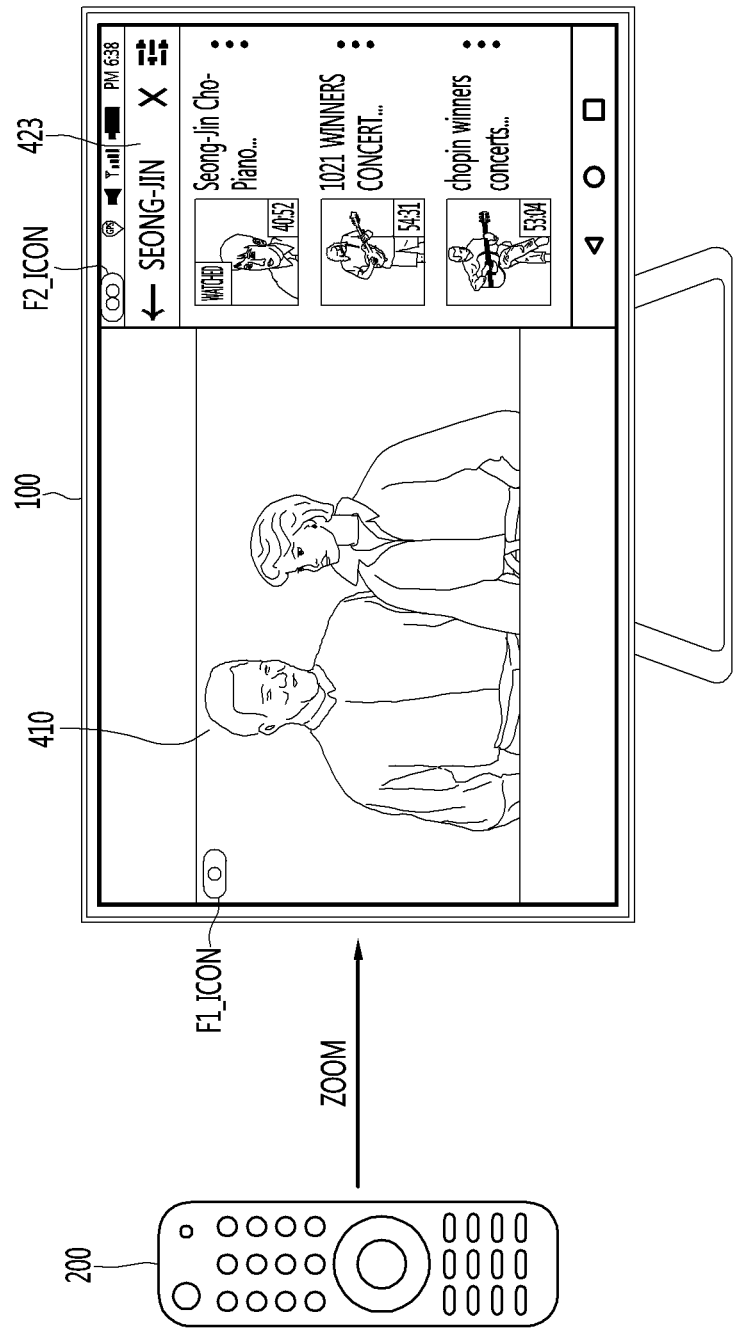

FIG. 16C
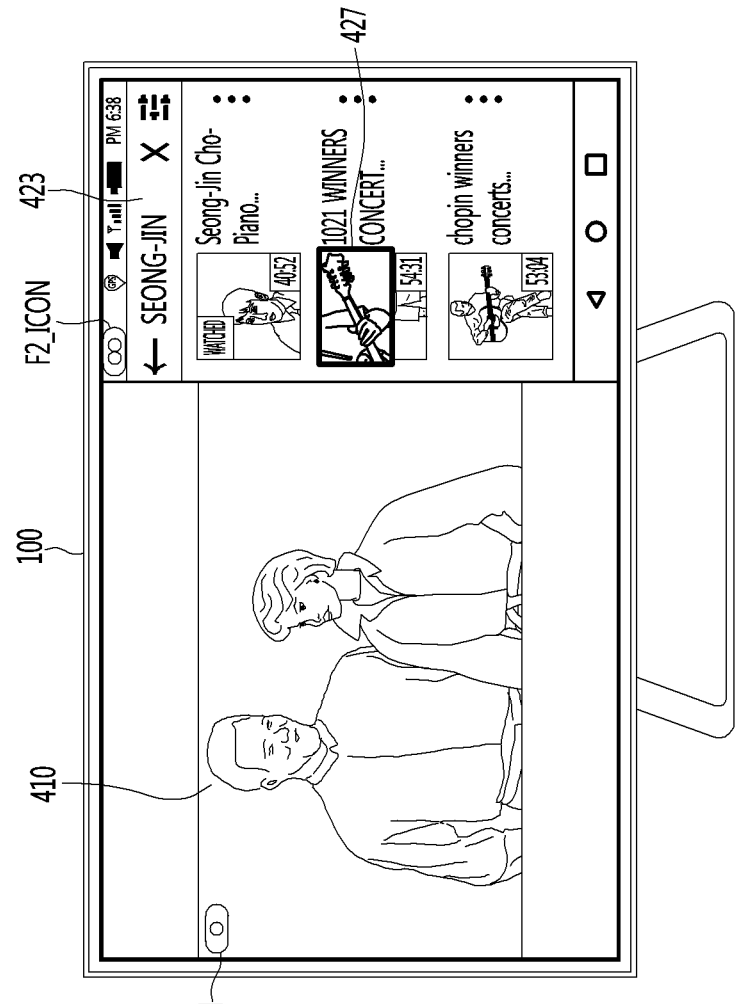
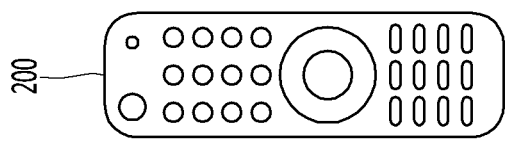

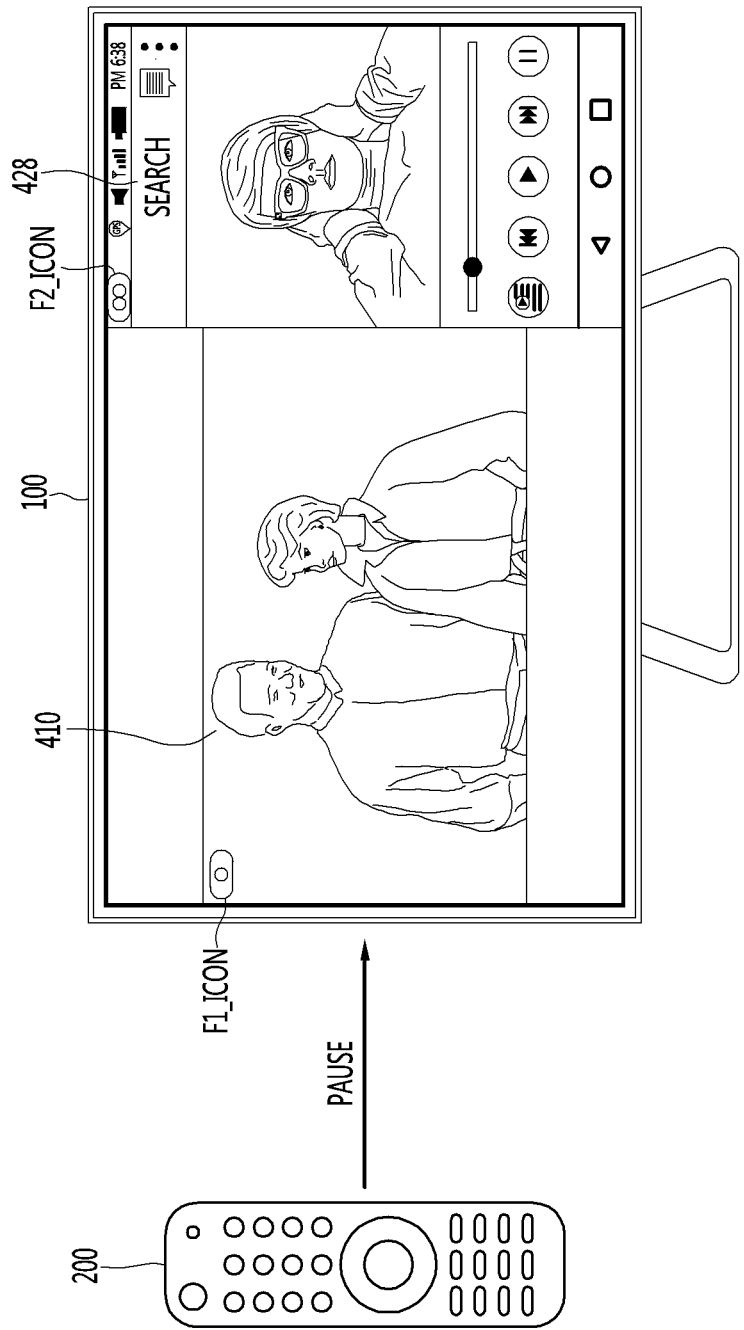

FIG. 17B
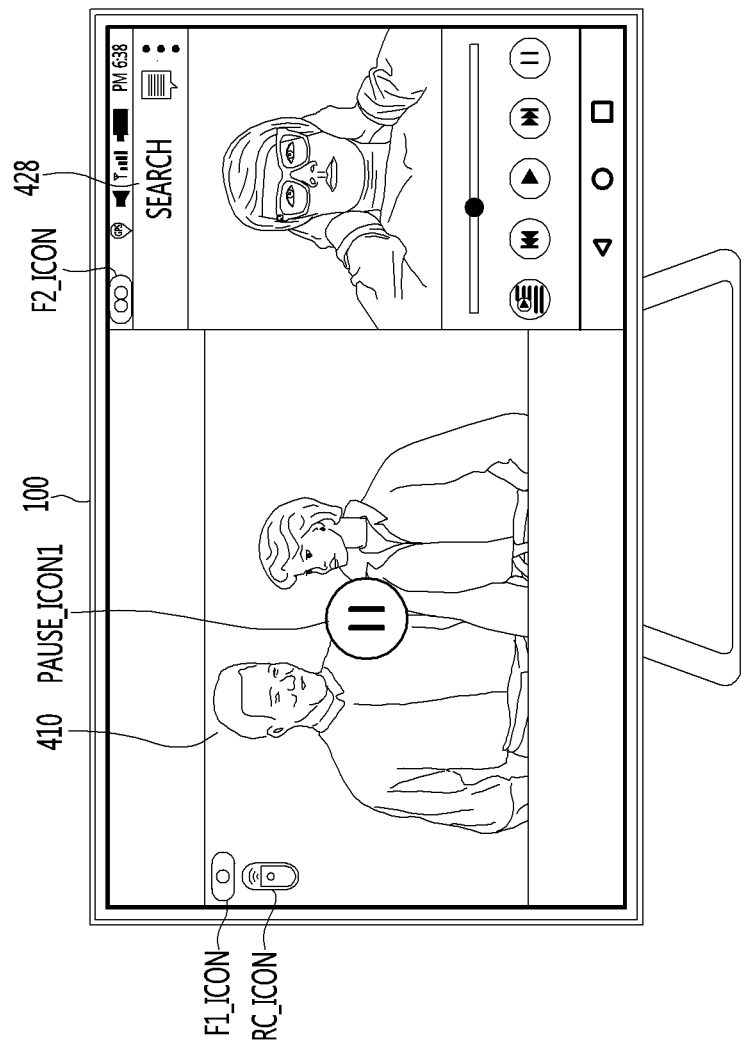
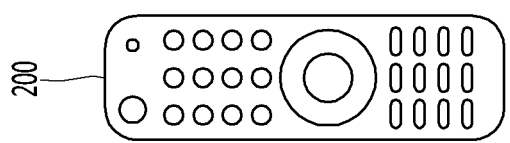

FIG. 17C
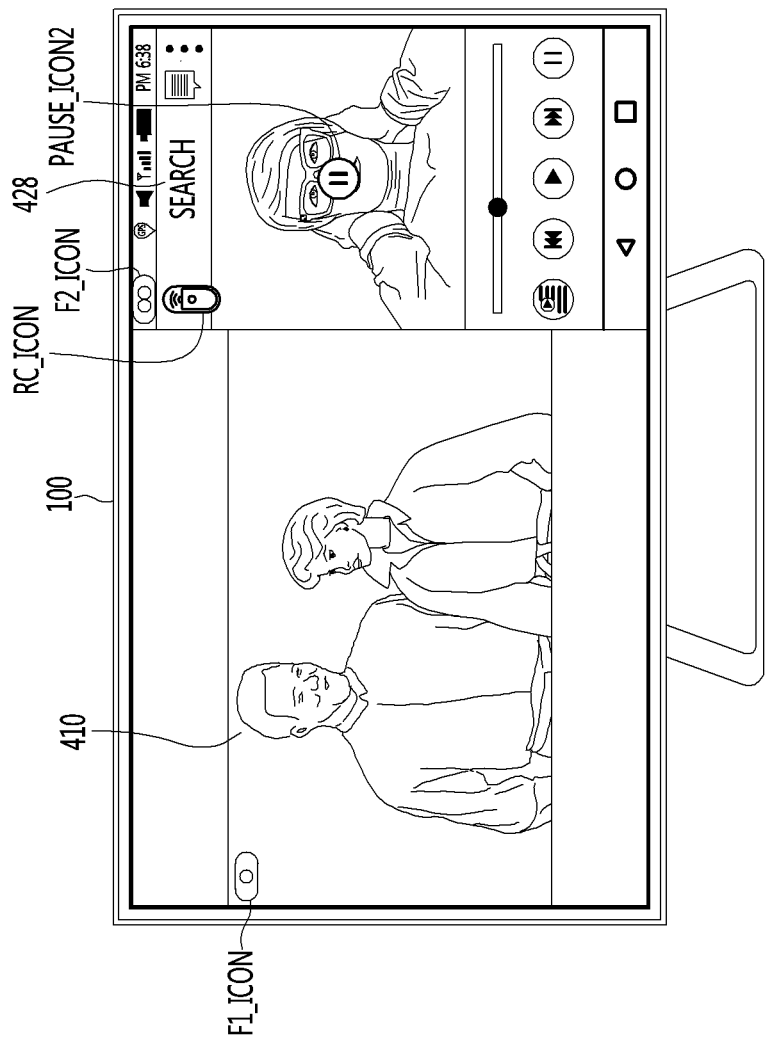
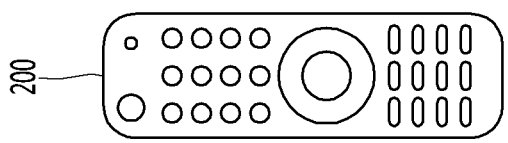

FIG. 20A
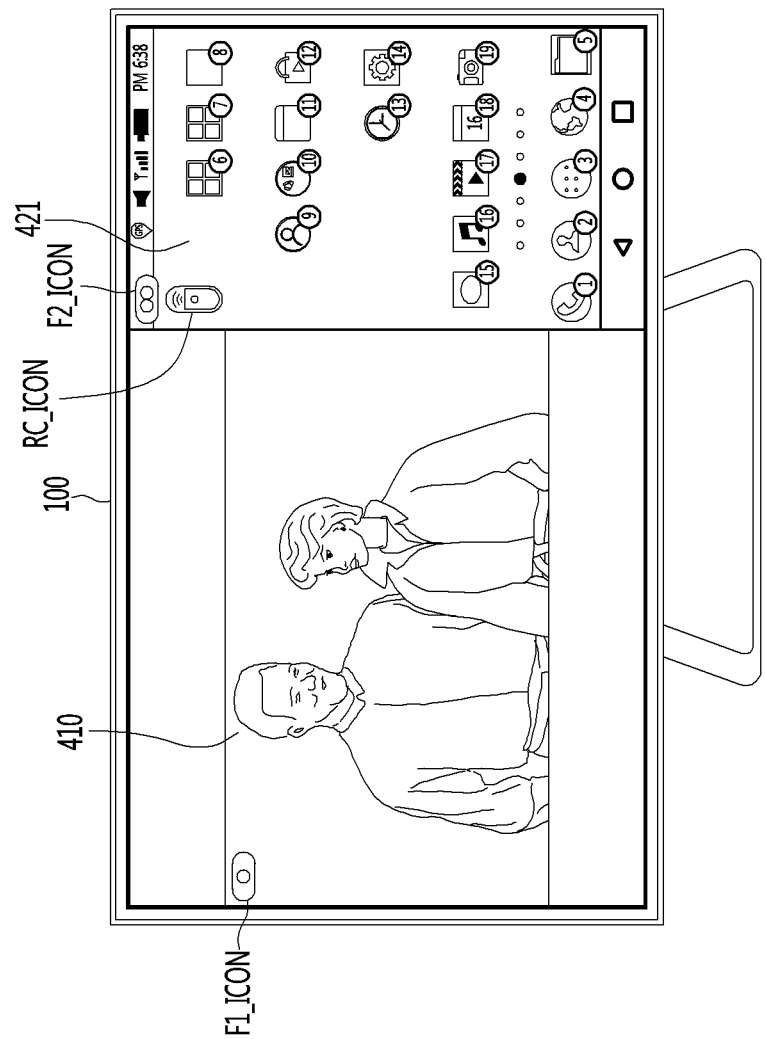
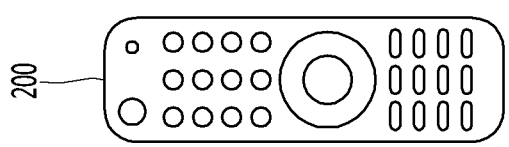

FIG. 21A
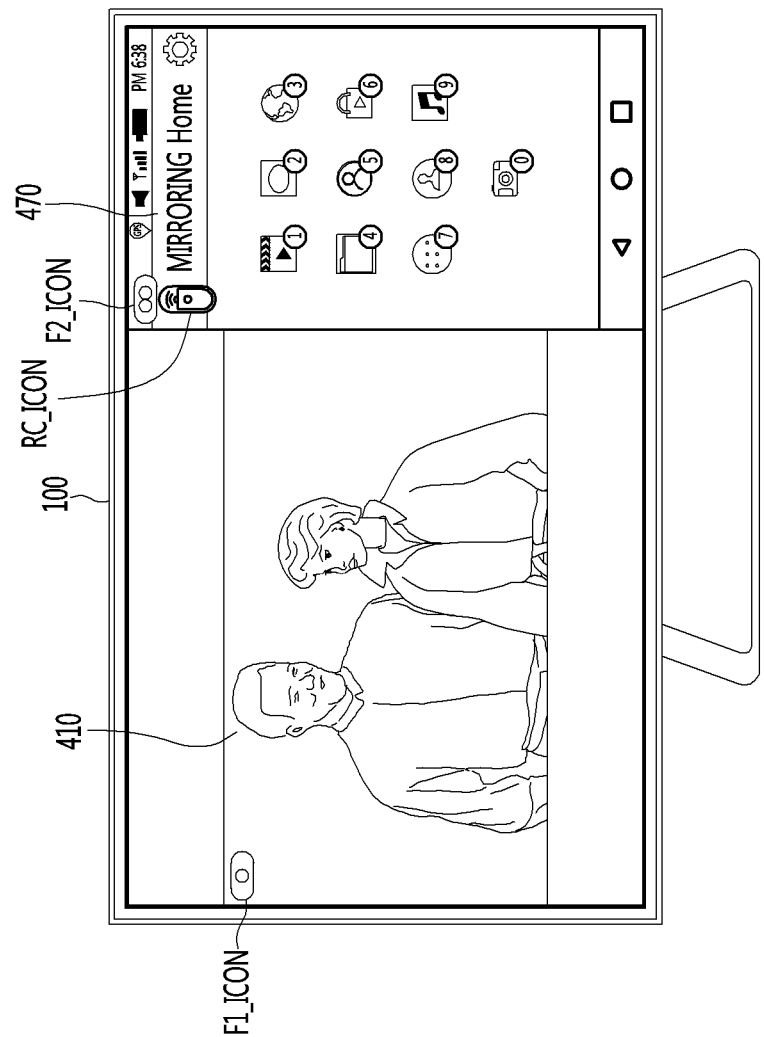
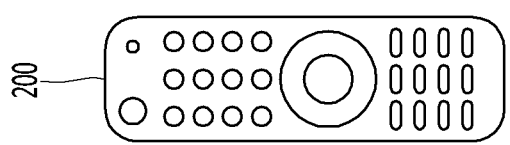

DISPLAY DEVICE AND METHOD OF OPERATING THE SAME

CROSS-REFERENCE TO RELATED APPLICATIONS

The present application claims the benefit of priority to Korean Patent Application No. 10-2016-0031467, filed on Mar. 16, 2016, which is herein incorporated by reference in its entirety.

BACKGROUND

Embodiments of the present invention relate to a display device, and in particular, a display device which selectively controls a plurality of source devices by using a remote control device when a plurality of pieces of content provided by the plurality of source devices are displayed, and a method of operating the display device.

A display device, such as TV, may be connected to various external devices, such as an antenna, a set-top box, a digital versatile disc (DVD) or blue-ray player, a game console, and a mobile terminal (for example, a smart phone or a tablet PC), and may receive and display content from the connected external devices.

Depending on cases, the display device may be simultaneously connected to a plurality of external devices and may display a plurality of pieces of content respectively received from the connected external devices on a single screen. In this case, a user may control the external devices by using a remote control device capable of controlling the external devices in a consolidated manner in order to control operations of the external devices which provide the plurality of pieces of content.

However, with respect to external devices which are non-controllable by using the remote control device, the user needs to control operations of the external devices by using a separate remote control device or directly manipulating each of the external devices.

In particular, a mirroring technology to display a screen of the mobile terminal on the display device as it is has emerged, but there is inconvenience that an operation of the mobile terminal that provides content through mirroring cannot be controlled by using the remote control device.

SUMMARY

Embodiments of the present invention provide a display device capable of displaying a plurality of pieces of content provided by a plurality of source devices and selectively controlling the plurality of source devices by using a remote control device.

In one embodiment, a display device includes a display unit configured to display a plurality of pieces of content received from a plurality of source devices connected to the display device; and a control unit configured to receive a control activation request for a first source device of the plurality of source devices from a remote control device, activate control of the first source device in response to the received control activation request, and control an operation of the first source device in response to the signal received from the remote control device.

The control unit may respectively allocate a plurality of buttons included in the remote control device to the plurality of source devices, receive a signal corresponding to an input of a first button of the plurality of allocated buttons as the control activation request for the first source device from the remote control device, and activate control of the first source device in response to the received signal.

The control unit may control the display unit to display an icon of each of the plurality of allocated buttons on content of a corresponding source device from among the plurality of pieces of content displayed through the display unit.

Default control commands respectively corresponding to plurality of allocated buttons may be deactivated during display of the plurality of pieces of content received from the plurality of source devices.

The control unit may display a pointer corresponding to movement of the remote control device, move a display position of the pointer based on information on the movement received from the remote control device, and activate control of a source device which provides content displayed at the position of the pointer.

The control unit may control the display unit to display a control activation icon indicating that control of the first source device is activated on content received from the first source device and displayed.

The control unit may determine a control command for the signal received from the remote control device and transmit the determined control command to the first source device, and the control command for the signal may be changed depending on a type of the first source device.

The control unit may respectively allocate one or more numbers to one or more menus included in the content received from the first source device of which control is activated, and control the display unit to respectively display the one or more allocated numbers on the corresponding menus.

The control unit may receive a signal corresponding to input of a specific number button from the remote control device, and transmit a command for selecting a menu allocated a number corresponding to the input of the specific number button based on the received signal.

The control unit may display a screen for selecting a source device which is to display content, receive a selection request for selecting the plurality of source devices based on the displayed screen, and receive the plurality of pieces of content from the plurality of source devices in response to the received selection request.

In another embodiment, a method of operating a display device, the method includes displaying a plurality of pieces of content received from a plurality of source devices connected to the display device; receiving a control activation request for a first source device of the plurality of source devices from a remote control device; activating control of the first source device in response to the received control activation request; and controlling an operation of the first source device in response to the signal received from the remote control device.

BRIEF DESCRIPTION OF THE DRAWINGS

FIGS. 8A to 8D are diagrams for describing an example in which a display device activates control of a specific source device in response to a control activation command received from a remote control device according to an embodiment of the present invention.

FIGS. 9A to 9C are diagrams for describing an operation of controlling a specific source device based on the input of a home button of a remote control device in a display device according to an embodiment of the present invention.

FIGS. 10A to 10D are diagrams for describing an operation of controlling a specific source device based on the input of an OK button of a remote control device in a display device, according to an embodiment of the present invention.

FIGS. 11A to 11C are diagrams for describing an operation of controlling a specific source device based on the input of a BACK button of a remote control device in a display device, according to an embodiment of the present invention.

FIGS. 12A to 12C are diagrams for describing an operation of controlling a specific source device based on input of a volume control button of a remote control device in a display device, according to an embodiment of the present invention.

FIGS. 13A to 13C are diagrams for describing an operation of controlling a specific source device based on the input of a channel control button of a remote control device in a display device, according to an embodiment of the present invention.

FIGS. 15A to 15D are diagrams for describing an operation of controlling a specific source device based on the input of an EXIT button of a remote control device in a display device, according to an embodiment of the present invention.

FIGS. 16A to 16C are diagrams for describing an operation of controlling a specific source device based on the input of a zoom button of a remote control device in a display device, according to an embodiment of the present invention.

FIGS. 17A to 17C are diagrams for describing an operation of controlling a specific source device based on the input of a trick playback control button of a remote control device in a display device, according to an embodiment of the present invention.

FIGS. 20A and 20B are diagrams for describing an operation of the display device illustrated in FIG. 18, according to another embodiment of the present invention.

FIGS. 21A and 21B are diagrams for describing an operation of the display device illustrated in FIG. 18, according to another embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
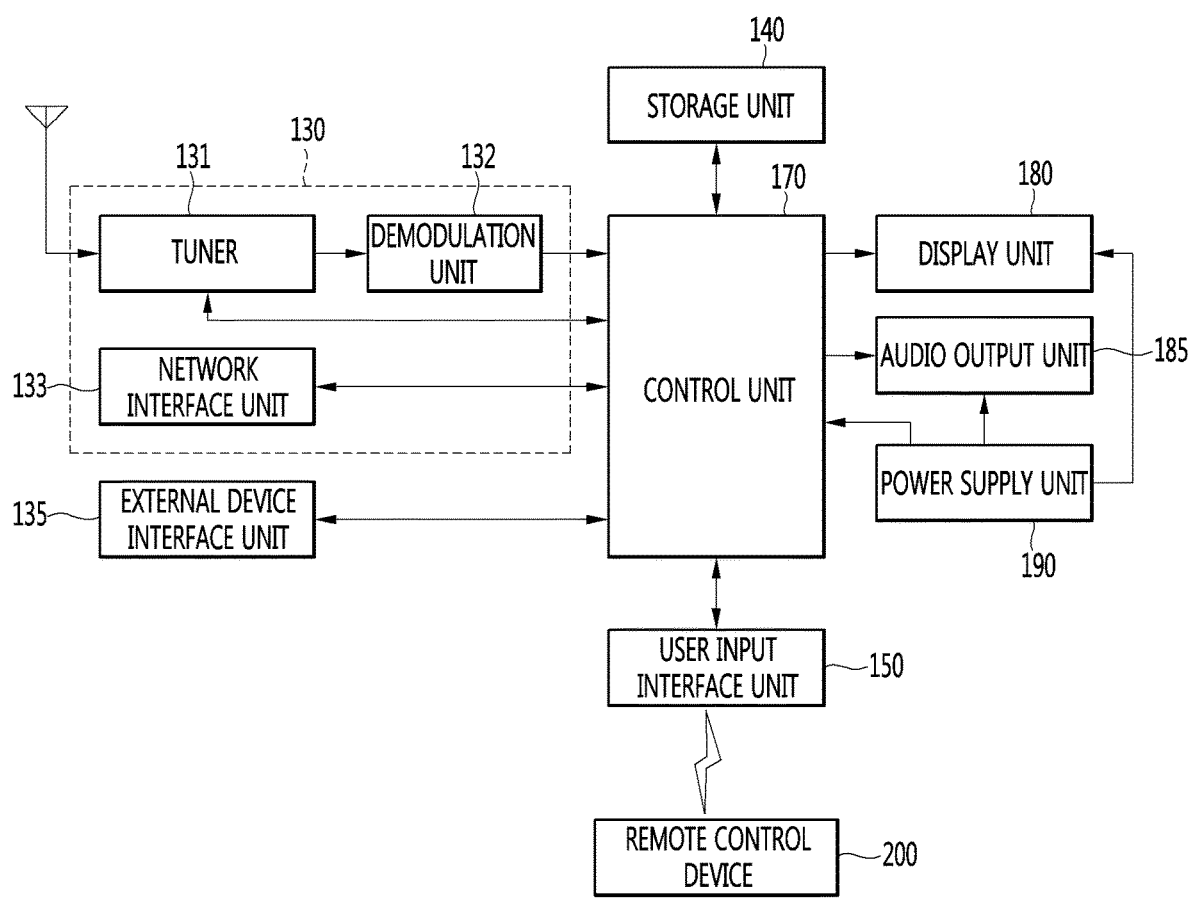
FIG. 1 is a block diagram of a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (UWB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The wireless communication unit 173 can be provided separated from the external device interface unit 135 and can be included in the external device interface unit 135.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
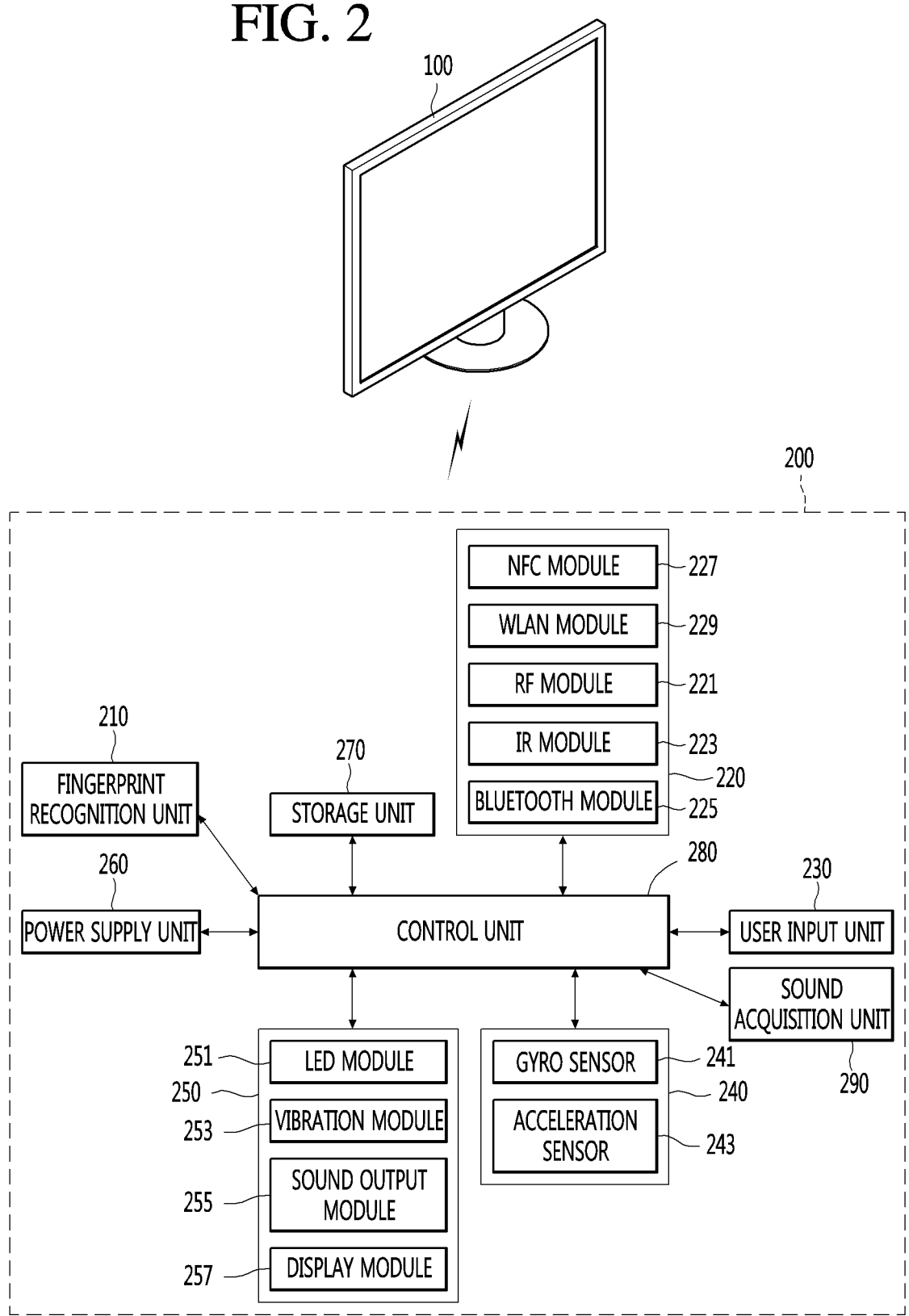
FIG. 2 is a block diagram of a remote control device according to an embodiment of the present invention.
Figure 3:
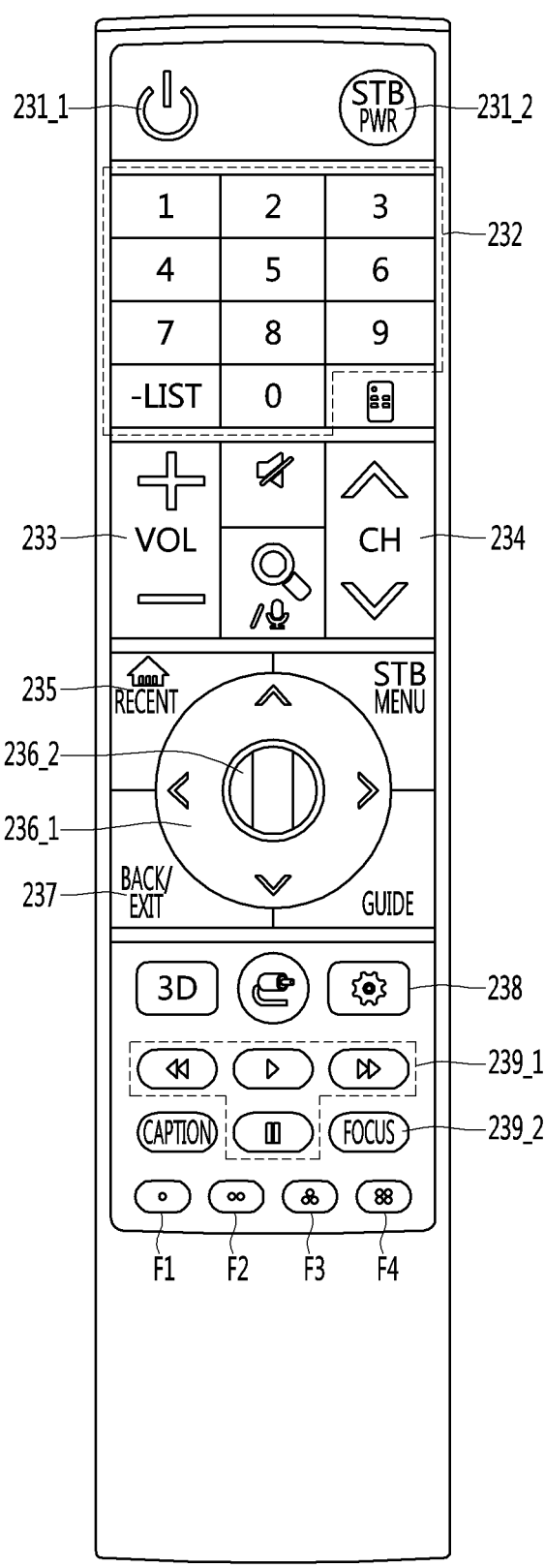
FIG. 3 is a diagram illustrating an actual configuration example of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. Referring to FIG. 3, the remote control device 200 may include a plurality of buttons. For example, the plurality of buttons may include a power button 231_1, a set-top power button 231_2, number buttons (0 to 9, including "-") 232, a volume control button 233, a channel control button 234, a home button 235, a direction button 236_1, an OK and wheel button 236_2, a BACK/EXIT button 237, a setting button 238, a trick playback control button 239_1, a zoom button (or FOCUS button) 239_2, and function buttons F1 to F4. The buttons of the remote control device 200 of FIG. 3 are merely an example for convenience of description, and therefore, some of the buttons included in the remote control device 200 may be deleted or changed, or additional buttons may be included in the remote control device 200, if needed.

The power button 231_1 may be a button for turning on/off a power supply of the display device 100, and the set-top power button 231_2 may be a button for turning on/off a power supply of a set-top box connected to the display device 100. The number buttons 232 may be buttons for inputting a channel number or inputting numbers to a text window. The volume control button 233 may be a button for adjusting an output volume of the display device 100. The channel control button 234 may be a button for switching a broadcast channel through which a broadcast signal is received. The home button 235 may be a button for calling a home screen of the display device 100. The direction button 236_1 may be a button for the focus movement of menus displayed through the display unit 180. The OK and wheel button 236_2 may be a button for selecting a specific menu or function or a button for channel switching or scrolling. The BACK/EXIT button 237 may be a button for returning back to a previous screen or switching back to a previous channel. The setting button 238 may be a button for calling a setting screen of the display device 100. The trick playback control button 239_1 may be a button for controlling playback of content in a thick mode. The zoom button 239_2 may be a button for expanding and displaying a specific part of content. The function buttons F1 to F4 may be buttons for executing any one of functions provided by the display device 100 other than the above-described functions. According to an embodiment, functions respectively corresponding to the function buttons F1 to F4 may be directly set through a setting menu of the display device 100. The function buttons F1 to F4 may be implemented to have different colors (for example, red, green, yellow, and blue), but are not limited thereto.

Also, according to an embodiment, some of the buttons described above have a plurality of commands. For example, a first input (for example, short press) of the home button 235_1 may correspond to a home screen display command, and a second input (for example, long press) of the home button 235_1 may correspond to a command for displaying a list of recently-used applications or a recently-used function. The first input of the BACK/EXIT button 237 may correspond to a command for displaying a previous screen, and the second input thereof may correspond to a command for terminating a function or application which is being executed.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
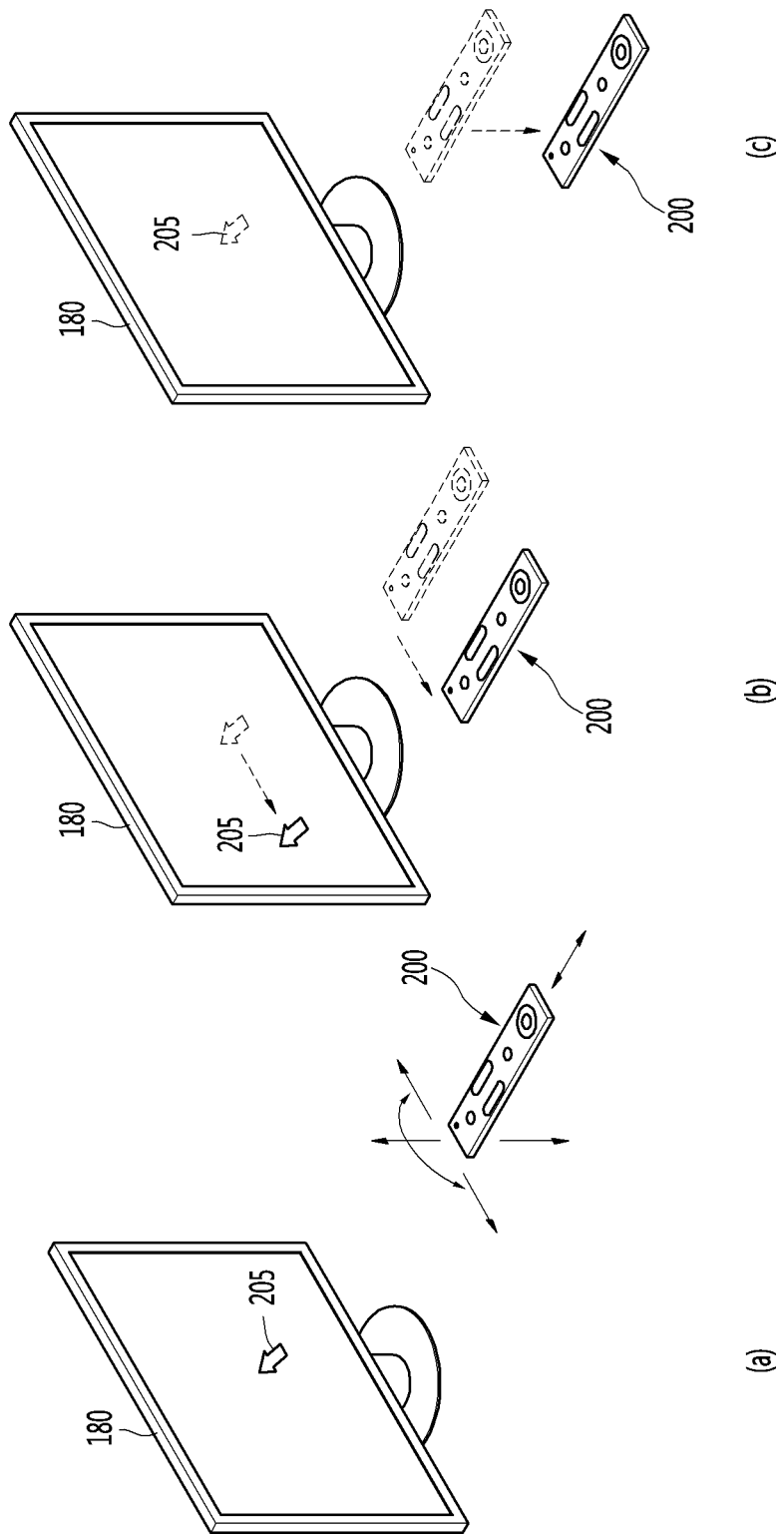
FIG. 4 is a diagram illustrating an example in which a remote control device is used according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, a method of operating the display device according to an embodiment of the present invention will be described.

Figure 5:
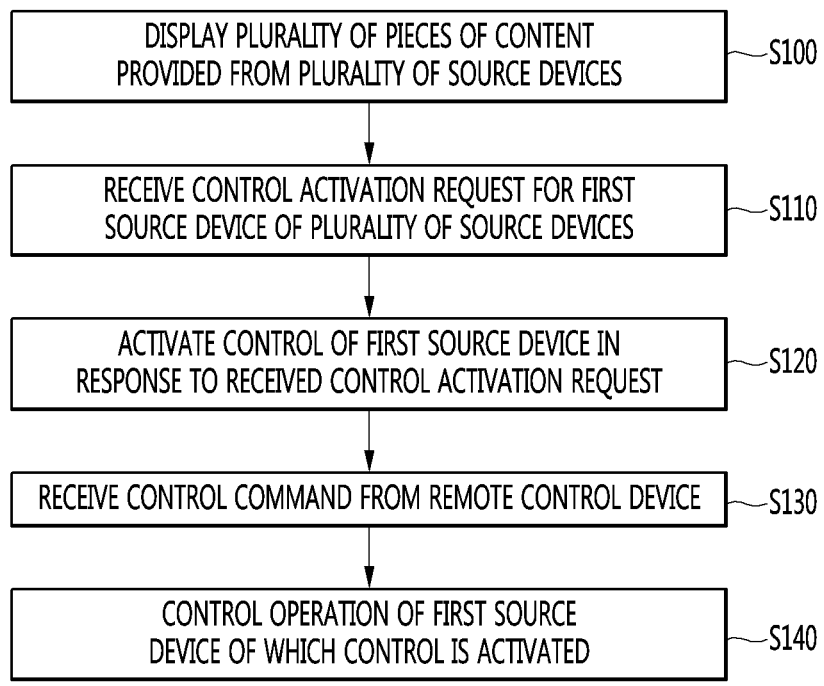
FIG. 5 is a flowchart of a method of operating a display device according to an embodiment of the present invention.

FIG. 5 is a flowchart of a method of operating the display device 100 according to an embodiment of the present invention.

Referring to FIG. 5, the display device 100 may display a plurality of pieces of content respectively provided from a plurality of source devices through a display unit 180 (S100).

The plurality of source devices are external devices connected to the display device, and may include a set-top box, a blue-ray player, a DVD player, a gaming device (game console), a mobile terminal, such as a smart phone, a personal computer (PC) and the like, as described above. Also, in the following description, for convenience of description, it is assumed that the plurality of source devices include the display device 100 itself (or antenna). That is, the plurality of source device mean all means or devices capable of providing content through the display unit 180 of the display device 100.

The display device 100 may simultaneously display the plurality of pieces of content through the display unit 180. The display device 100 may display the plurality of pieces of content in various ways. For example, the display device 100 may divide a screen of the display unit 180 to a plurality of regions and respectively display the plurality of pieces of content on the plurality of regions. The display device 100 may display any one piece of content on all of the regions, and display another content by superimposing the another content on some of the regions (for example, picture in picture (PIP) screen).

The display device 100 may receive a control activation request for one of the plurality of source devices which provide content, for example, a first source device (S110) and activate the control of the first source device in response to the control activation request (S120).

Specifically, the display device 100 may receive the control activation request through various types of input devices, such as the remote control device 200. Although the display device 100 is illustrated as receiving the control activation request from the remote control device 200, the control activation request may be received through various input devices (for example, mouse, keyboard, microphone, or camera) other than the remote control device 200.

Steps S100 to S120 will be described below in detail with reference to FIGS. 6 to 8D.

Figure 6:
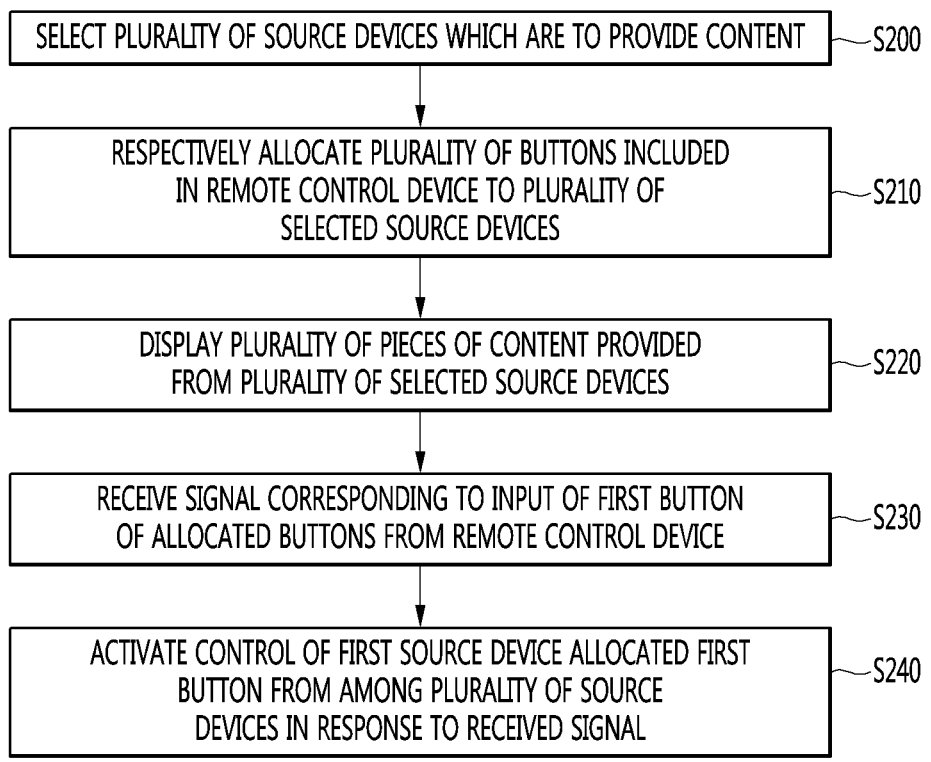
FIG. 6 is a flowchart for describing an example in which a display device activates control of a specific source device corresponding to the input of a button of a remote control device an according to an embodiment of the present invention.

FIG. 6 is a flowchart of describing an example in which a display device activates control of a specific source device corresponding to the input of a button of a remote control device an according to an embodiment of the present invention.

Referring to FIG. 6, the display device 100 may receive a selection request for selecting a plurality of source devices that are to provide content (S200).

For example, the control unit 170 of the display device 100 may display a list of all source devices connected to the display device 100 through the display unit 180 and receive the selection request for selecting the plurality of source devices based on the displayed list.

The display device 100 may respectively allocate buttons included in the remote control device 200 to the plurality of source devices selected in step S200 (S210).

The following description will be given under the assumption that the function buttons F1 to F4 illustrated in FIG. 3 are respectively allocated to the plurality of source devices, but a certain button included in the remote control device 200 may be allocated to any one of the plurality of source devices depending on embodiments.

In this case, a default request or a default control command corresponding to a button allocated to any one of the plurality of source device may be deactivated during a period of time for which the plurality of pieces of content provided from the plurality of source device are displayed through the display unit 180. That is, when receiving a signal corresponding to the input of the button allocated to any one of the plurality of source devices, the control unit 170 may not execute the default command of the selected button.

The display device 100 may display the plurality of pieces of content provided from the plurality of selected source devices (S220). Step S220 is substantially identical to step S100 in FIG. 5.

The display device 100 may receive a signal (or command) corresponding to the input of a first button of the allocated buttons from the remote control device 200 (S230) and activate control of the first source device allocated the first button from among the plurality of source devices in response to the received signal (S240).

Step S230 and step S240 may respectively correspond to step S110 and step S120 of FIG. 5. That is, the control activation request of step S110 may correspond to a signal corresponding to the input of the first button in step S230.

According to an embodiment, the control unit 170 may respectively display icons corresponding to the buttons allocated to the plurality of source devices on the pieces of content provided from the corresponding source devices. The user may input a button allocated to a source device of which control is to be activated based on the displayed icons.

Also, the control unit 170 may display a control activation icon indicating that control of the first source device is activated on content provided from the first source device of which control is activated.

Steps S200 to S240 will be described below in detail with reference to FIGS. 7A to 8D.

FIGS. 7A to 7D are diagrams for describing an operation of displaying a plurality of pieces of content provided from a plurality of source devices in a display device according to an embodiment of the present invention.

Figure 7A:
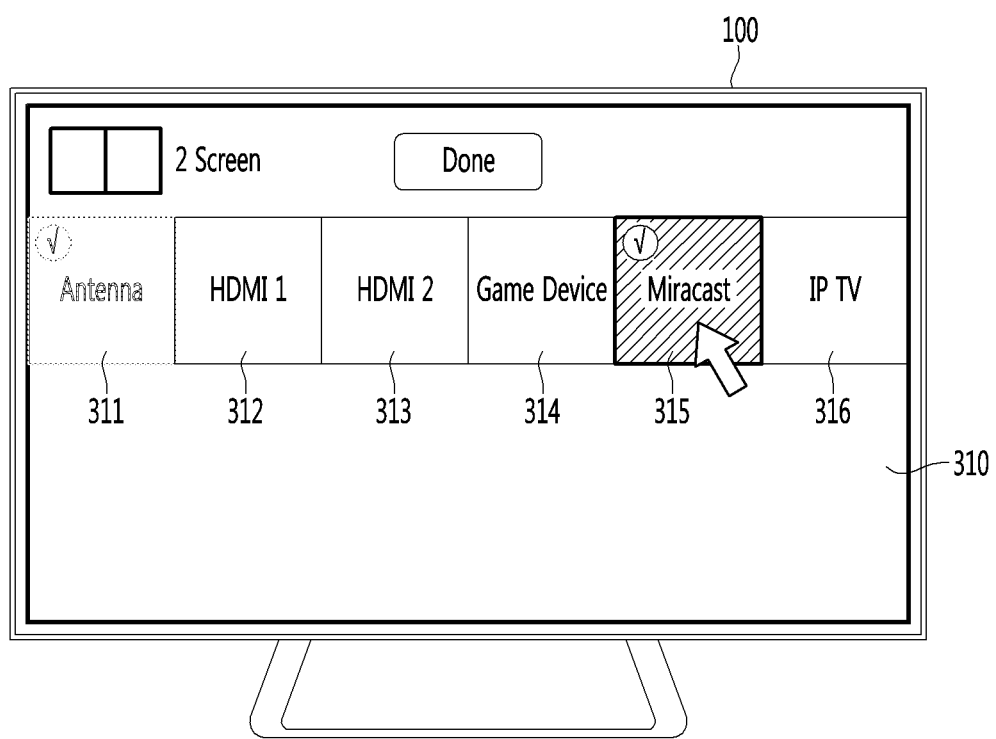
FIGS. 7A to 7D are diagrams for describing an operation of displaying a plurality of pieces of content provided from a plurality of source devices in a display device according to an embodiment of the present invention.

Referring to FIG. 7A, the control unit 170 may display a source device selection screen 310 for selecting a source device that is to display content through the display unit 180. The source device selection screen 310 may include one or more source device icons 311 to 316 respectively corresponding to one or more source devices which are connected to the display device 100 or are capable of providing content to the display device 100.

Figure 7B:
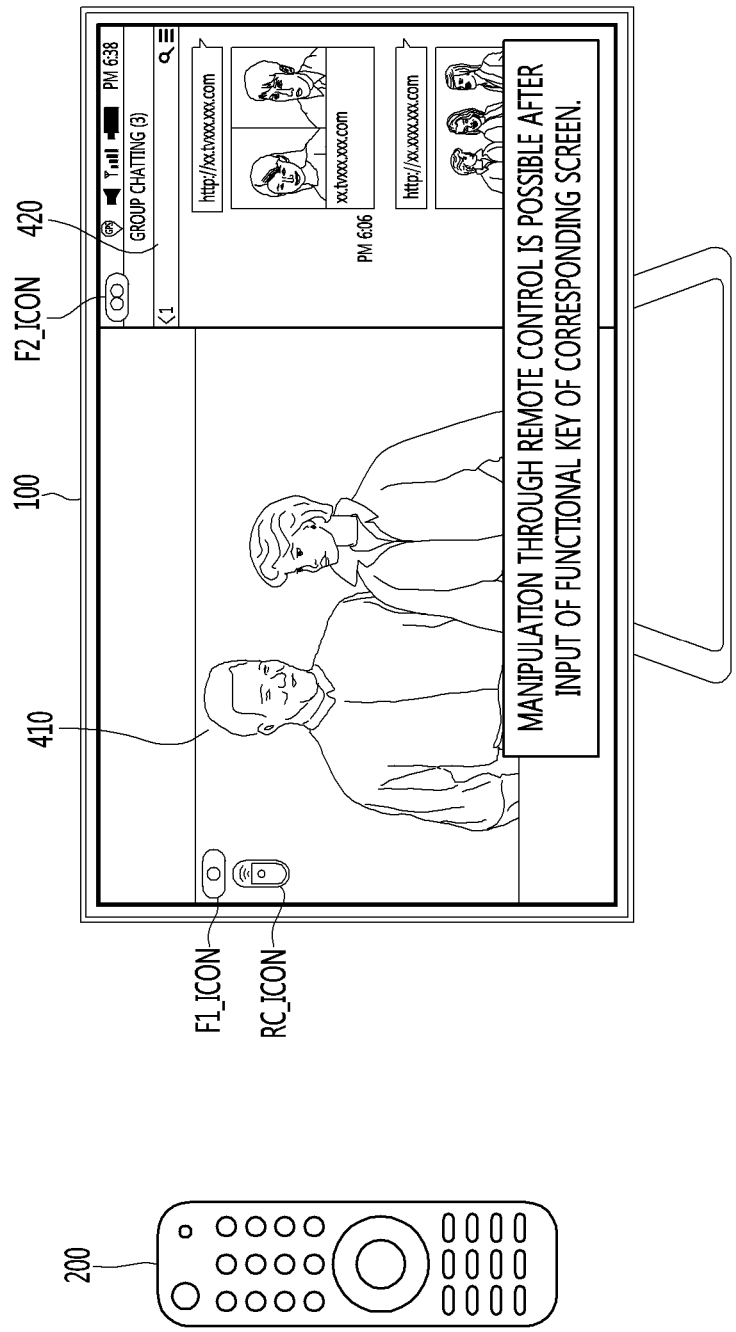

The control unit 170 may select a source device that is to display content through the display unit 180 in response to a selection request received through an input device, such as the remote control device 200. Referring to FIGS. 7A and 7B, when an antenna icon (Antenna) 311 and a mirroring icon (Miracast) 315 are selected from among the one or more source device icons 311 to 316 included in the source device selection screen 310, the control unit 170 may display content 410 received from an antenna (or broadcast reception unit 130) included in the display device 100 and a mirror screen 420 received from a mobile terminal (for example, a smart phone), through the display unit 180.

The "mirroring" or "screen mirroring" refers to displaying a screen of a terminal, such as a smart phone or a tablet PC, as it is on the display device.

When the antenna icon 311 and the mirroring icon 315 are selected, the control unit 170 may allocate a first function button F1 of the buttons included in the remote control device 200 (for example, the function buttons F1 to F4 illustrated in FIG. 3) to the antenna and a second function button F2 to the mobile terminal.

As illustrated in FIG. 7B, the control unit 170 may display the first function button icon F1_ICON on the content 410 received from the antenna and the second function button icon F2 ICON on the mirror screen 420 received from the mobile terminal, based on the buttons (the first function button F1 and the second function button F2) respectively allocated to the source devices (the antenna and the mobile terminal).

Also, the control unit 170 may display a control activation icon RC_ICON on the content that is transmitted from a source device of which the control is currently activated (sometimes, referred to as "control-activated source device) and is displayed on the display unit 180. The control-activated source device may refer to a source device of which the operation is controllable by the remote control device 200. For example, when the control activation icon RC_ICON is displayed on the content 410 transmitted from the antenna included in the display device 100 and displayed, the control unit 170 may control an operation of the display device 100 itself or control the content 410 received from the antenna in response to a control command received from the remote control device 200.

Figure 7C:
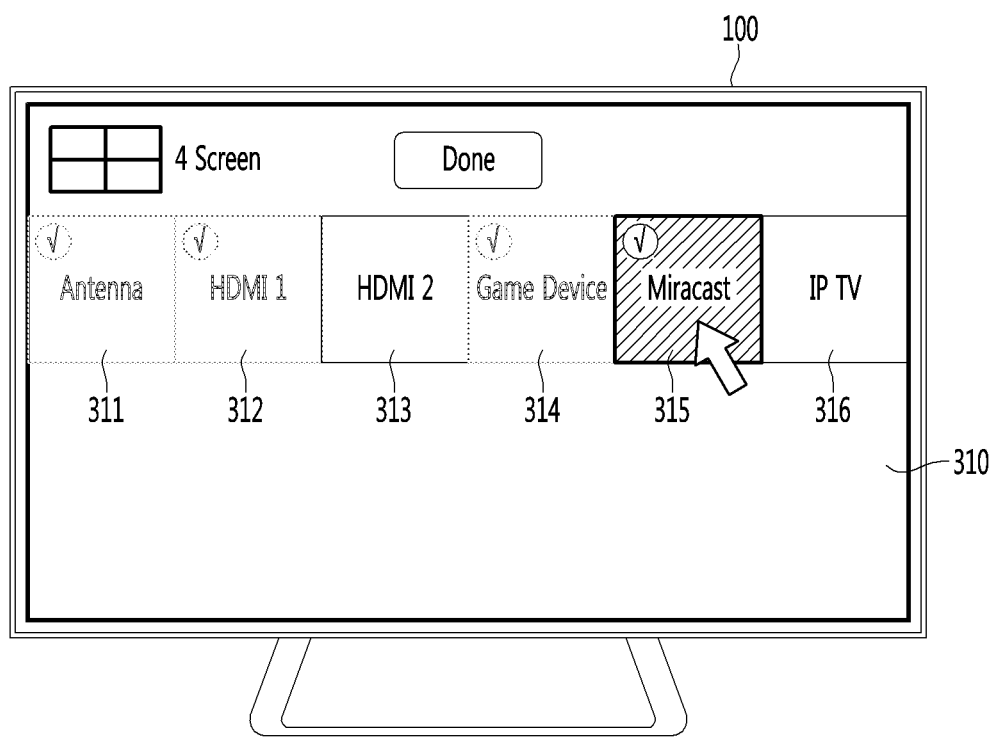
Figure 7D:
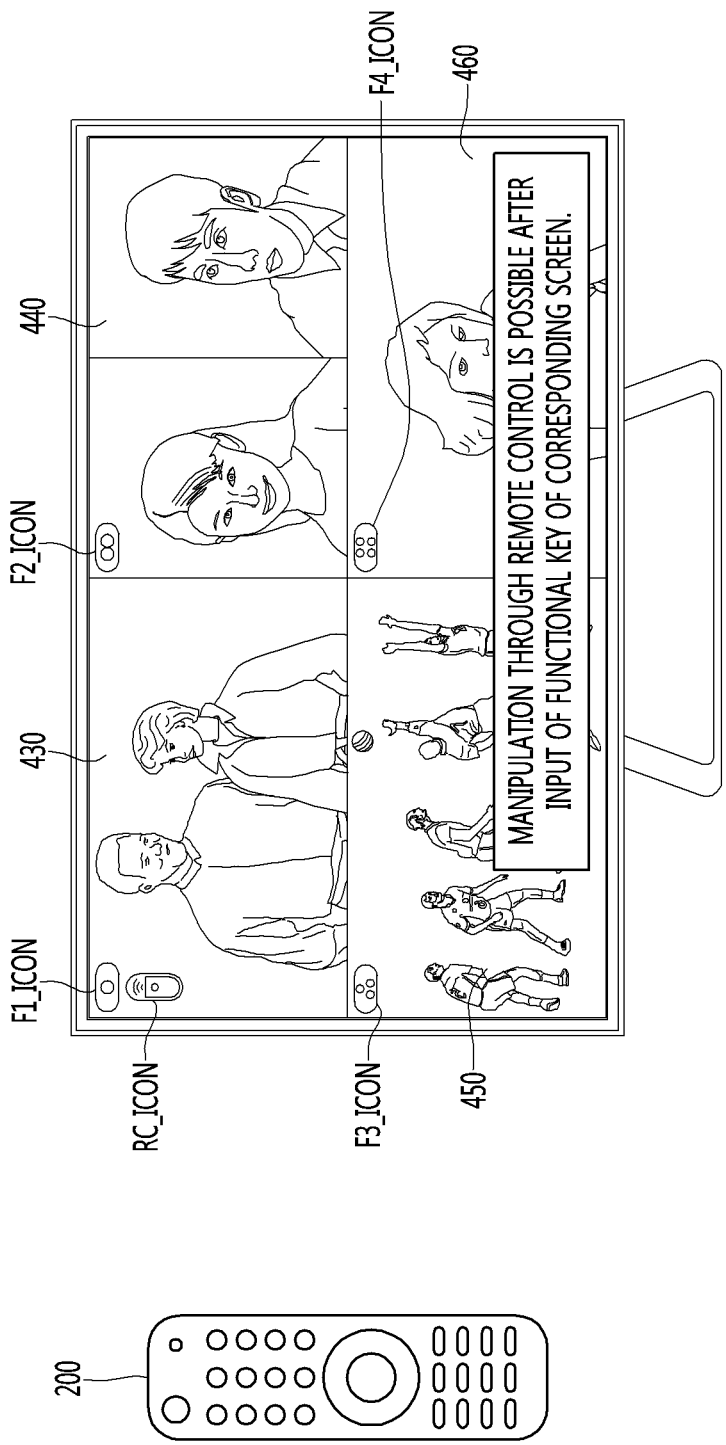

Referring to FIGS. 7C and 7D, when an antenna icon 311, an HDMI1 icon 312, a game console icon 314, and a mirroring icon 315 are selected from among the one or more source device icons 311 to 316 included in the source device selection screen 310, the control unit 170 may display content 430 received from the antenna, content 440 received from a source device connected thereto through an HDMI1 terminal, content 450 received from a game console, and a mirror screen 460 received from a mobile terminal, through the display unit 180.

Also, the control unit 170 may respectively allocate the buttons of the remote control device 200 (for example, function buttons F1 to F4) to the selected source devices. For example, as illustrated in FIG. 7D, the control unit 170 may allocate the first function button F1 to the antenna, the second function button F2 to the source device connected thereto through the HDMI1 terminal, the third function button F3 to the game console, and the fourth function button F4 to the mobile terminal.

In this case, as described with reference to FIG. 7B, the control unit 170 may display the function button icons F1_ICON to F4_ICON on the pieces of content 430 to 460 of the corresponding source devices. Also, the control unit 170 may display the control activation icon RC_ICON on the content which is received from a control-activated source device and is displayed.

With respect to the subsequent drawings, embodiments of the present invention will be described based on the display device 100 illustrated in FIGS. 7A and 7B, that is, the display device 100 which displays the content received from the antenna and the mirroring screen received from the mobile terminal.

FIGS. 8A to 8D are diagrams for describing an example in which the display device activates control of a specific source device in response to a control activation command received from a remote control device according to an embodiment of the present invention.

Referring to FIGS. 8A to 8D, the control unit 170 may receive a control activation request (or command) for any one source device from the remote control device 200 and activate control of the any one source device in response to the received control activation request.

Figure 8A:
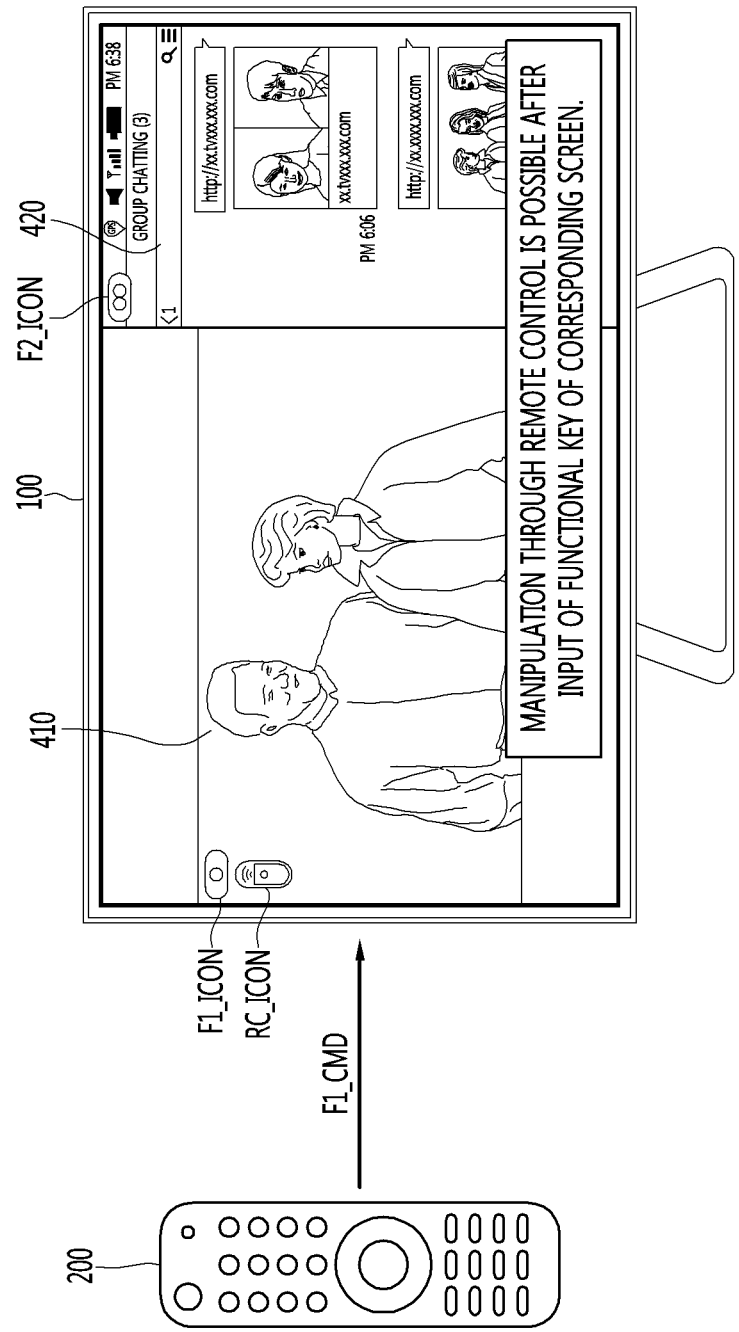
Figure 8B:
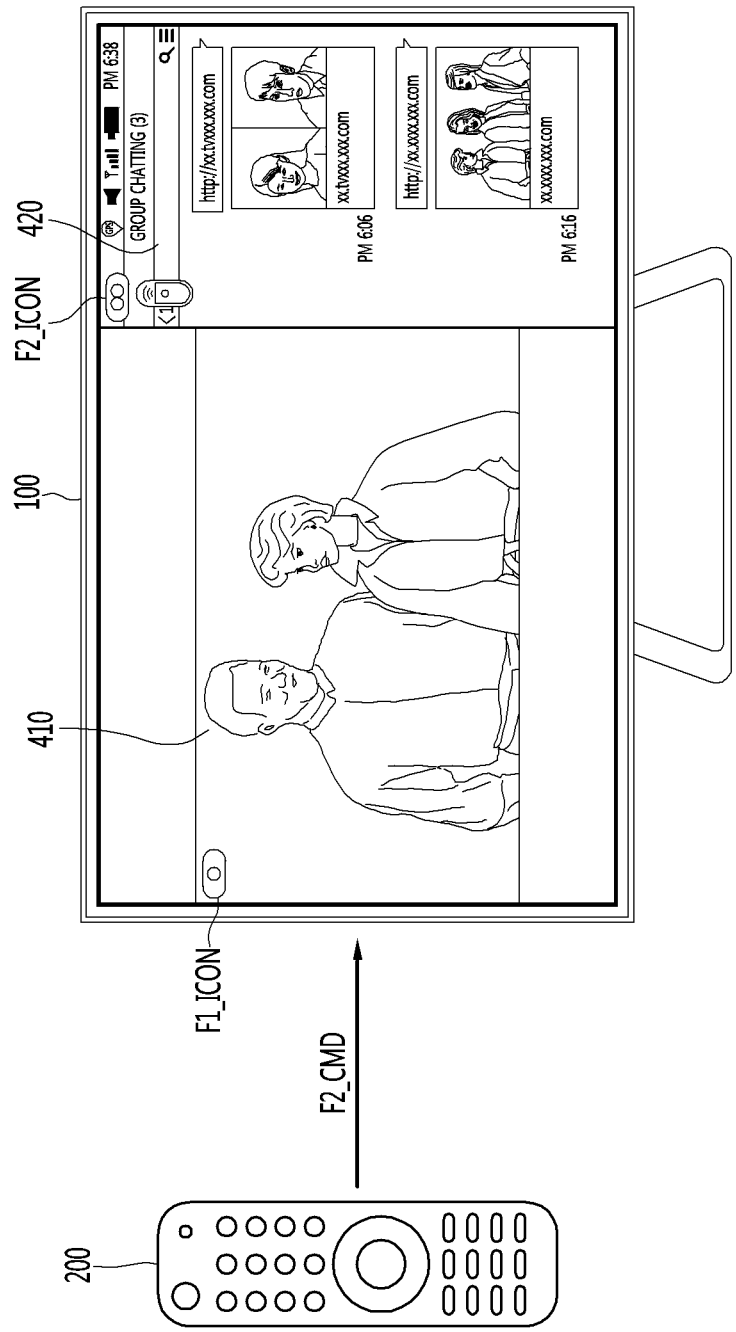

Specifically, referring to FIGS. 8A and 8B, when one of the first function button F1 allocated to the antenna and the second function button F2 allocated to the mobile terminal is input, the remote control device 200 may transmit a signal or control command corresponding to the input function button to the display device 100.

As illustrated in FIG. 8A, when the first function button F1 is input, the control unit 170 may receive a signal F1_CMD corresponding to the input of the first function button from the remote control device 200.

The control unit 170 may activate the control of the antenna allocated the first function button F1 based on the received signal F1_CMD. That is, the signal F1_CMD corresponding to the input of the first function button represents a control activation request for the antenna.

The control unit 170 may display the control activation icon RC_ICON on the content 410 provided from the antenna of which the control is activated. That is, the control unit 170 may notify the user that the control of the antenna is currently activated by displaying the control activation icon RC_ICON on the content 410 provided from the antenna.

Although there is only described herein the embodiment in which the control activation icon RC_ICON is displayed in order to notify the user that the control of the antenna is currently activated, the control unit 170 may notify the user that the control of the antenna is activated by using various methods (for example, sound, text, pop-up windows, and the like).

On the other hand, as illustrated in FIG. 8B, when a signal F2_CMD corresponding to the input of the second function button is received from the remote control device 200, the control unit 170 may activate the control of the mobile terminal allocated the second function button F2. That is, the signal F2_CMD corresponding to the input of the second function button may represent a control activation request for the mobile terminal. The control unit 170 may display the control activation icon RC_ICON on the mirroring screen 420 provided from the mobile terminal in order to notify the user that the control of the mobile terminal is activated.

Figure 8D:
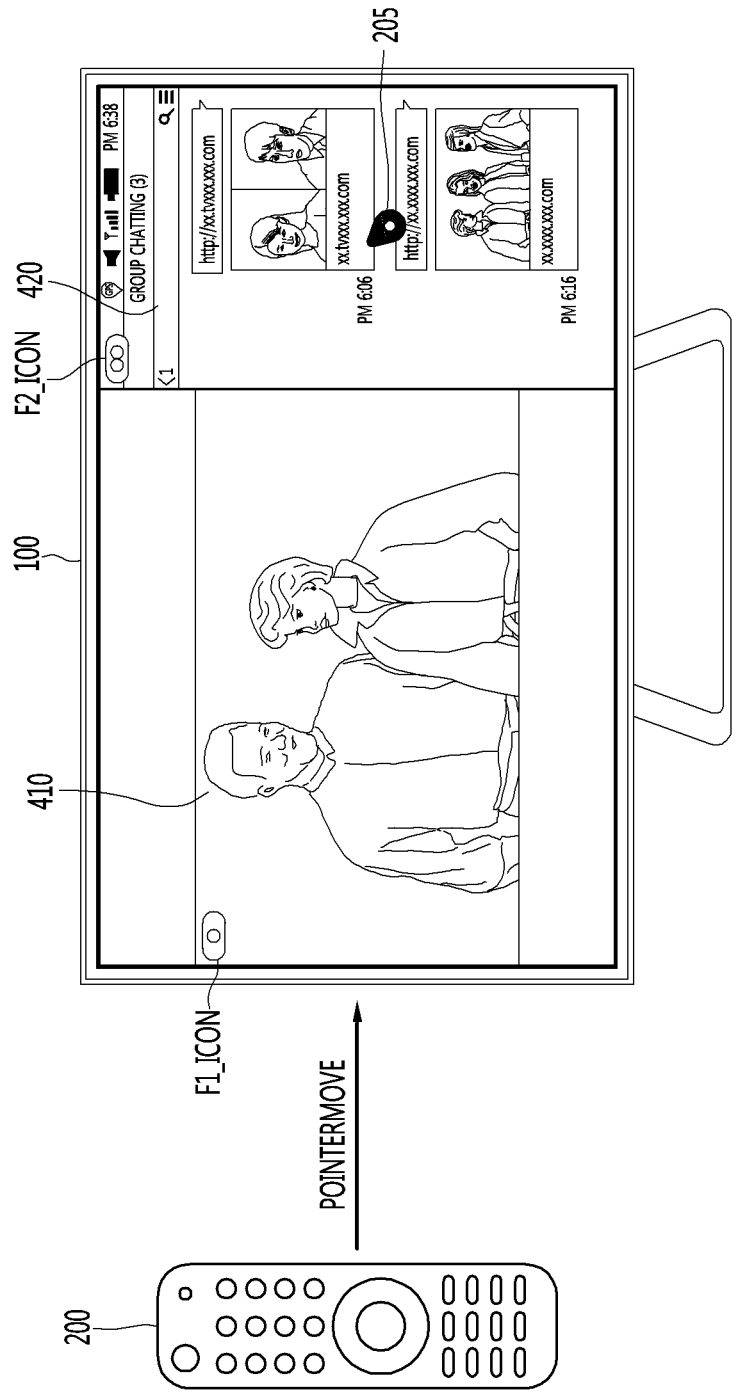

Referring to FIGS. 8C and 8D, as described with reference to FIG. 4, when the display device 100 displays a pointer 205 corresponding to movement of the remote control device 200, the control unit 170 may activate control of a source device which provides content corresponding to a current display position of the pointer 205.

As illustrated in FIG. 8C, when the pointer 205 is displayed on the content 410 provided from the antenna, the control unit 170 may activate the control of the antenna. In this case, since the user can know a control-activated source device based on the display position of the pointer 205, the control unit 170 may not display the control activation icon RC_ICON during a period of time when the pointer 205 is displayed.

Referring to FIG. 8D, the control unit 170 may receive a pointer movement request POINTERMOVE according to the movement of the remote control device 200, from the remote control device 200. The pointer movement request POINTERMOVE may include information on the movement of the remote control device 200. The control unit 170 may move and then display the pointer 205 based on the received pointer movement request POINTERMOVE.

When the pointer 205 is displayed on the mirroring screen 420 provided from the mobile terminal, the control unit 170 may deactivate the control of the antenna and activate the control of the mobile terminal.

That is, when the pointer 205 is positioned on the content 410 provided from the antenna, the control unit 170 may control the antenna or the content 410, based on a control command received from the remote control device 200. On the other hand, when the pointer 205 is positioned on the mirroring screen 420 provided from the mobile terminal, the control unit 170 may control the mobile terminal or the mirroring screen 420, based on a control command received from the remote control device 200.

That is, according to the embodiments of FIGS. 6 to 8D, the user can conveniently select a source device to be controlled, by using the remote control device 200 when a plurality of pieces of content are provided from a plurality of source devices through the display device 100.

Referring back to FIG. 5, details will be described.

The display device 100 may receive a control command from the remote control device 200 (S130).

Specifically, a case in which the display device 100 receives the control command from the remote control device 200 may mean that the display device 100 receives a signal corresponding to the input of a specific button from the remote control device 200 and determines the control command based on the received signal.

The display device 100 may control an operation of a first source device of which the control is activated, based on the received control command (S140).

In this case, the control command corresponding to a signal received from the remote control device 200 may be changed depending on a type of the first source device of which the control is activated.

That is, the control unit 170 may determine a control command and transmit the determined control command to the first source device based on the type of the first source device of which the control is currently activated, with respect to the signal received from the remote control device 200. In this case, the storage unit 140 of the display device 100 may store information on control commands respectively corresponding to signals received from the remote control device 200 in connection with the types of the source devices. For example, a lookup table including information on the control commands respectively corresponding to the received signals may be stored in the storage unit 140. Therefore, the following description will be given with reference to the subsequent drawings under the assumption that the control unit 170 of the display device 100 controls the source device by determining a control command with respect to the signal received from the remote control device 200 and transmitting the determined control command to the first source device.

Depending on embodiments, the control unit 170 may transmit the signal received from the remote control device 200 to the first source device and the first source may determine a control command corresponding to the received signal and execute an operation corresponding to the determined control command. In this case, each of the source devices may store information on control commands respectively corresponding to signals which are received from the display device 100.

Also, the information on the control commands respectively corresponding to the signals which is stored in the storage unit 140 of the display device 100 or each of the source devices may be freely changed according to user settings.

Various embodiments in which the display device 100 controls an operation of a source device based on a signal received subsequently to the input of a specific button of the remote control device 200 will be described with reference to FIGS. 9A to 21B.

Although there are merely illustrated embodiments in which the display device 100 controls an operation of an antenna or a mobile terminal based on a signal or request received subsequently to the input of a specific button of the remote control device 200, in FIGS. 9A to 21B, embodiments according to the concept of the present invention may be similarly applied to various source devices other than the antenna and the mobile terminal.

In addition, although there are merely illustrated embodiments in which the display device 100 controls a source device based on the input of the home button 235, the OK button 236_2, the BACK/EXIT button 237, the volume control button 233, the channel control button 234, the setting button 238, the zoom button 239_2, the trick playback control button 239_1, or the number buttons 232, in FIGS. 9A to 21B, the display device 100 may control the source device based on an input through various buttons other than the above-described buttons or input means included in the remote control device 200.

Figure 9A:
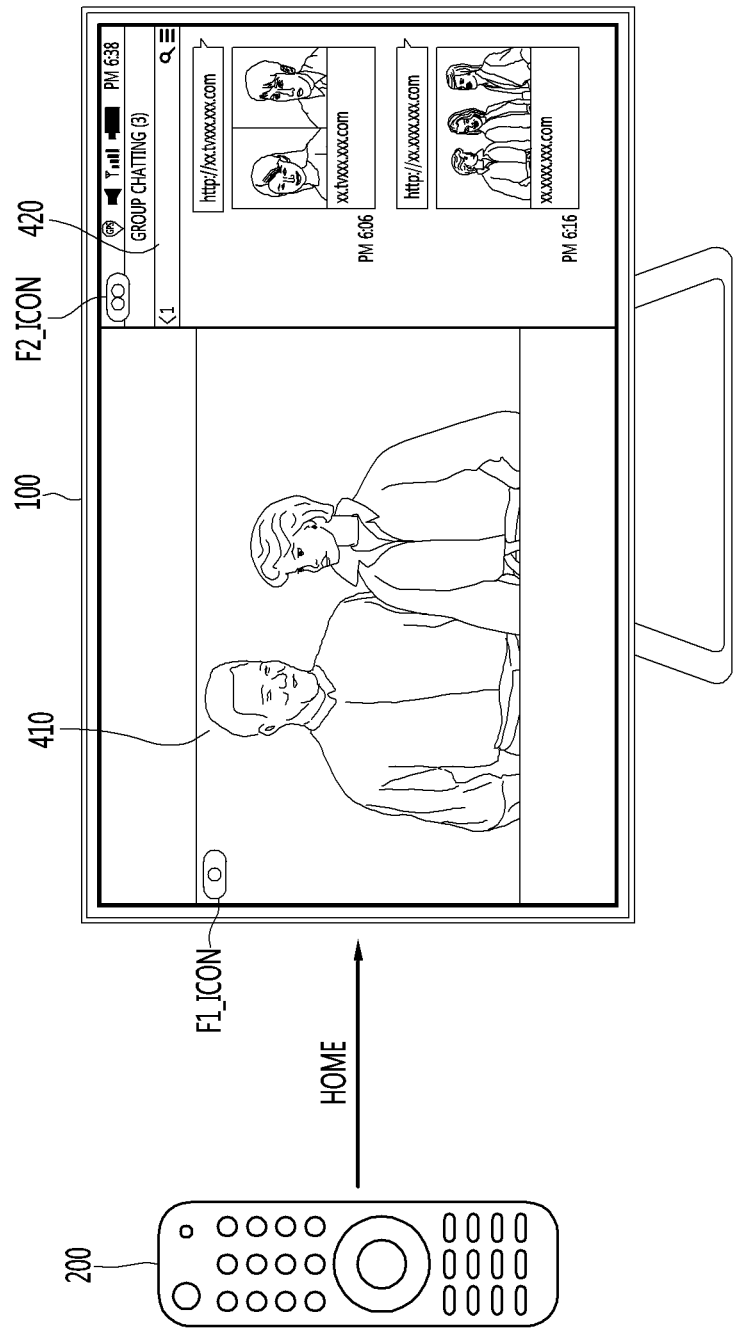
Figure 9B:
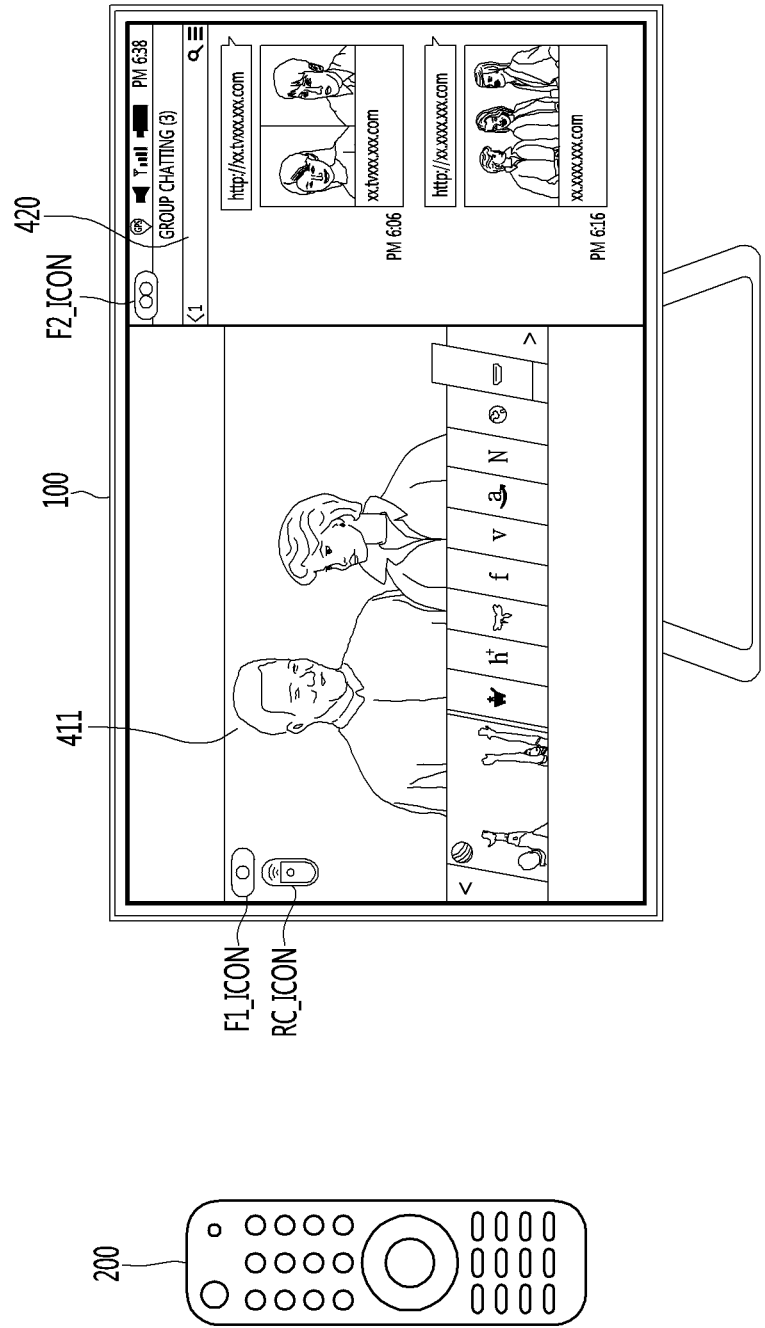

FIGS. 9A to 9C are diagrams for describing an operation of controlling a specific source device based on the input of a home button of a remote control device in a display device, according to an embodiment of the present invention.

Referring to FIG. 9A, the remote control device 200 may transmit a home button input signal HOME to the display device 100 in response to the input of the home button 235 included in the user input unit 230.

The control unit 170 of the display device 100 may control an operation of a control-activated source device from among the source devices (the antenna and the mobile terminal) which provide content, in response to the home button input signal HOME received from the remote control device 200.

Referring to FIG. 9B, when the control-activated source device is the antenna included in the display device 100, the control unit 170 may control the antenna or an operation of the display device 100 itself in response to the received home button input signal HOME.

For example, when a control command of the display device 100 corresponding to the home button input signal HOME is a home screen calling command, the control unit 170 may display a home screen 411 on content 410 provided from the antenna.

On the other hand, referring to FIG. 9C, when the control-activated source device is the mobile terminal, the control unit 170 may control an operation of the mobile terminal in response to the received home button input signal HOME.

For example, when a control command of the mobile terminal corresponding to the home button input signal HOME is a home screen entry command, the control unit 170 may transmit the home screen entry command to the mobile terminal. The mobile terminal may display the home screen in response to the received home screen entry command and transmit data corresponding to the displayed home screen to the display device 100. The control unit 170 may display the home screen as a mirroring screen 421, based on data received from the mobile terminal.

FIGS. 10A to 10D are diagrams for describing an operation of controlling a specific source device based on the input of an OK button of a remote control device in a display device, according to an embodiment of the present invention.

Referring to FIG. 10A, the remote control device 200 may transmit an OK button input signal OK to the display device 100 in response to input of the OK button 235 included in the user input unit 230.

Referring to FIG. 10B, when a control-activated source device is the antenna included in the display device 100, the control unit 170 may control an operation of the antenna or the display device 100 itself in response to the received OK button input signal OK.

For example, when a control command of the display device 100 corresponding to the OK button input signal OK is an execution command for executing a menu EXT_ICON1 currently selected (or, currently focused) from among menus displayed on the home screen 411, the control unit 170 may execute a function corresponding to the selected menu EXT_ICON1. When the selected menu EXT_ICON1 corresponds to a function of displaying content provided from another source device connected to the display device 100, the control unit 170 may display content 412 provided from the another source device through the display unit 180.

Figure 10D:
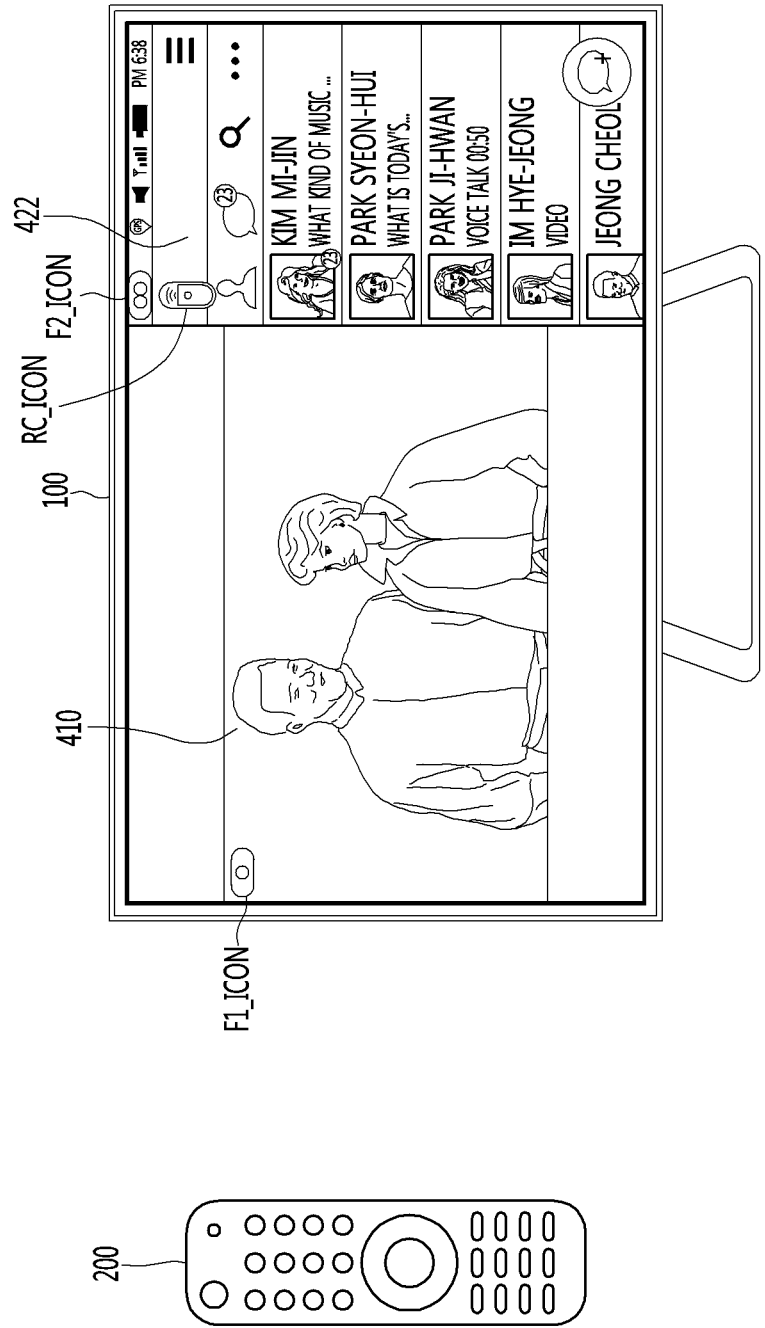

On the other hand, referring to FIGS. 10C and 10D, when the control-activated source device is currently the mobile terminal, the control unit 170 may control an operation of the mobile terminal in response to the received OK button input signal OK.

For example, when a control command of the mobile terminal corresponding to the OK button input signal OK is a selection command for selecting an icon APP_ICON1 currently focused from among application icons displayed on the mobile terminal, the control unit 170 may transmit the selection command to the mobile terminal. The mobile terminal may execute an application corresponding to the currently-focused icon APP_ICON1 in response to the received selection command and transmit, to the display device 100, data corresponding to a screen of the application which is being displayed as a result of the execution. The control unit 170 may display the screen of the executed application as the mirroring screen 422, based on the data received from the mobile terminal.

Figure 11A:
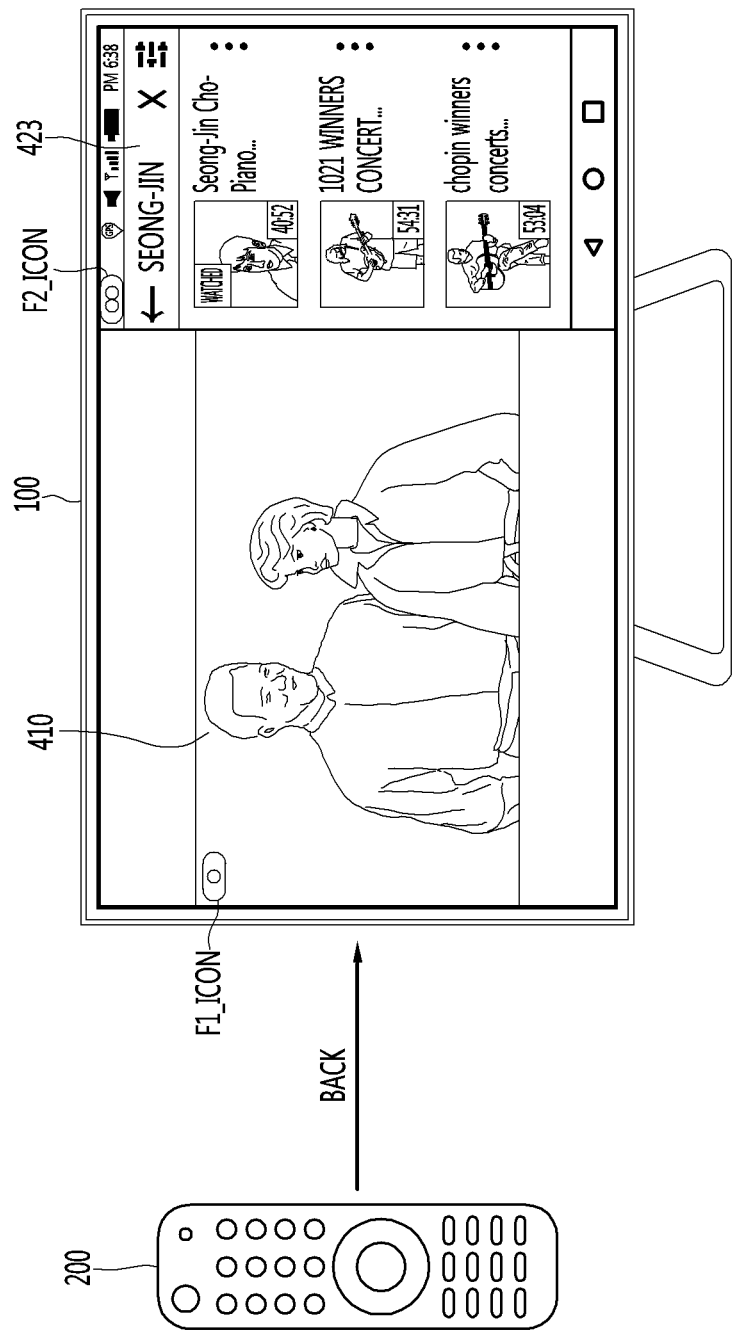
Figure 11B:
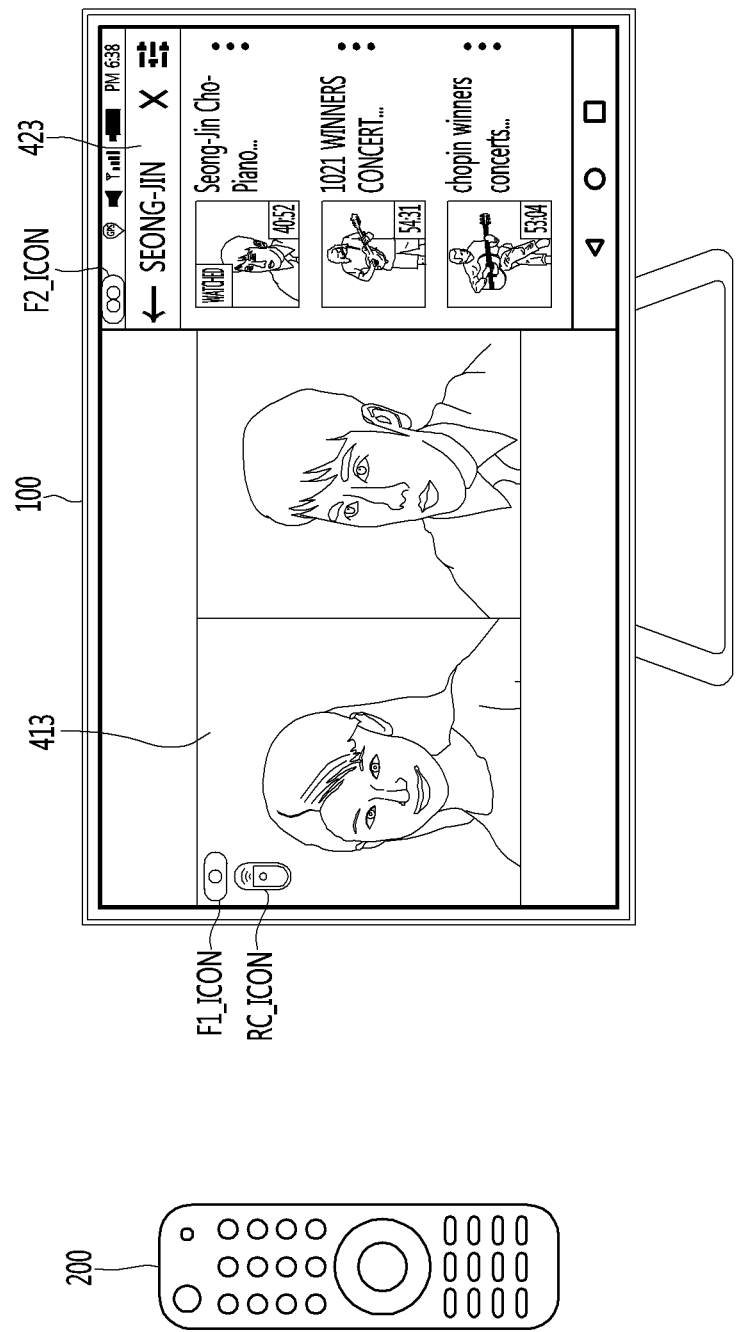

FIGS. 11A to 11C are diagrams for describing an operation of controlling a specific source device based on the input of a BACK button of a remote control device in a display device, according to an embodiment of the present invention.

Referring to FIG. 11A, the remote control device 200 may transmit a BACK button input signal BACK to the display device 100 in response to the input of the BACK button 237 included in the user input unit 230.

The control unit 170 may control an operation of a control-activated source device from among the source devices (the antenna and the mobile terminal) which provide content, in response to the BACK button input signal BACK received from the remote control device 200.

Referring to FIG. 11B, when the control-activated source device is the antenna included in the display device 100, the control unit 170 may control an operation of the antenna or the display device 100 itself in response to the received BACK button input signal BACK.

For example, when a control command of the display device 100 corresponding to the BACK button input signal BACK is a command for switching back to a previous channel, the control unit 170 may display content 413 which is provided from a channel prior to display of the content 410 provided from the current channel.

On the other hand, referring to FIG. 11C, when the control-activated source device is the mobile terminal, the control unit 170 may control an operation of the mobile terminal in response to the received BACK button input signal BACK.

For example, when a control command of the mobile terminal corresponding to the BACK button input signal BACK is a return command (for example, a previous-screen display command), the control unit 170 may transmit the return command to the mobile terminal. The mobile terminal may display the previous screen 424 before the screen 423 which is being displayed currently in response to the received return command and transmit data corresponding to the displayed previous screen 424 to the display device 100. The control unit 170 may display the previous screen 424 as the mirroring screen, based on data received from the mobile terminal.

Figure 12A:
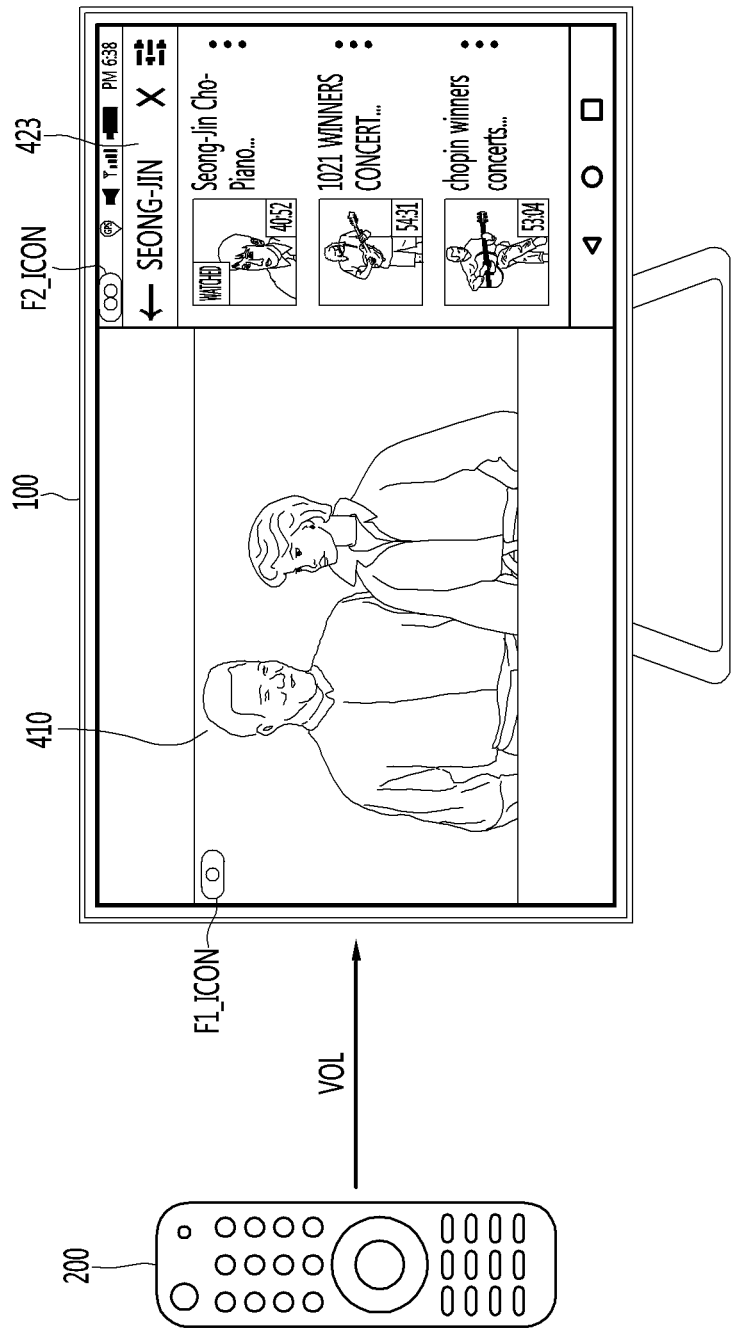

FIGS. 12A to 12C are diagrams for describing an operation of controlling a specific source device based on the input of a volume control button of a remote control device in a display device, according to an embodiment of the present invention.

Referring to FIGS. 12A to 12C, the remote control device 200 may transmit a volume control button input signal VOL to the display device 100 in response to the input of the volume control button 233 included in the user input unit 230.

The control unit 170 of the display device 100 may control a volume of a control-activated source device from among the source devices (the antenna and the mobile terminal) which provide content, in response to the volume control button input signal VOL received from the remote control device 200.

As illustrated in FIG. 12B, when the control-activated source device is the antenna included in the display device 100, the control unit 170 may control a volume of content 410 in response to the received volume control button input signal VOL. According to an embodiment, the control unit 170 may display a first volume icon VOL_ICON1 for notifying of a volume control state for the content 410.

Also, as illustrated in FIG. 12C, when the control-activated source device is the mobile terminal, the control unit 170 may control a volume of content displayed through the mobile terminal or the mirroring screen 423 in response to the received volume control button input signal VOL. According to an embodiment, the control unit 170 may display a second volume icon VOL_ICON2 for notifying of a volume control state for the mobile terminal.

Although not illustrated, when a plurality of pieces of content provided from a plurality of source devices include audio data respectively, the control unit 170 may control the audio output unit 185 to output only audio data of content provided from a control-activated source device.

For example, as illustrated in FIG. 12B, when the control of the antenna is activated, the control unit 170 may control the audio output unit 185 to output audio for the content 410. On the other hand, as illustrated in FIG. 12C, when the control of the mobile terminal is activated, the control unit 170 may control the audio output unit 185 to output audio for the content displayed through the mirroring screen 423.

Figure 13A:
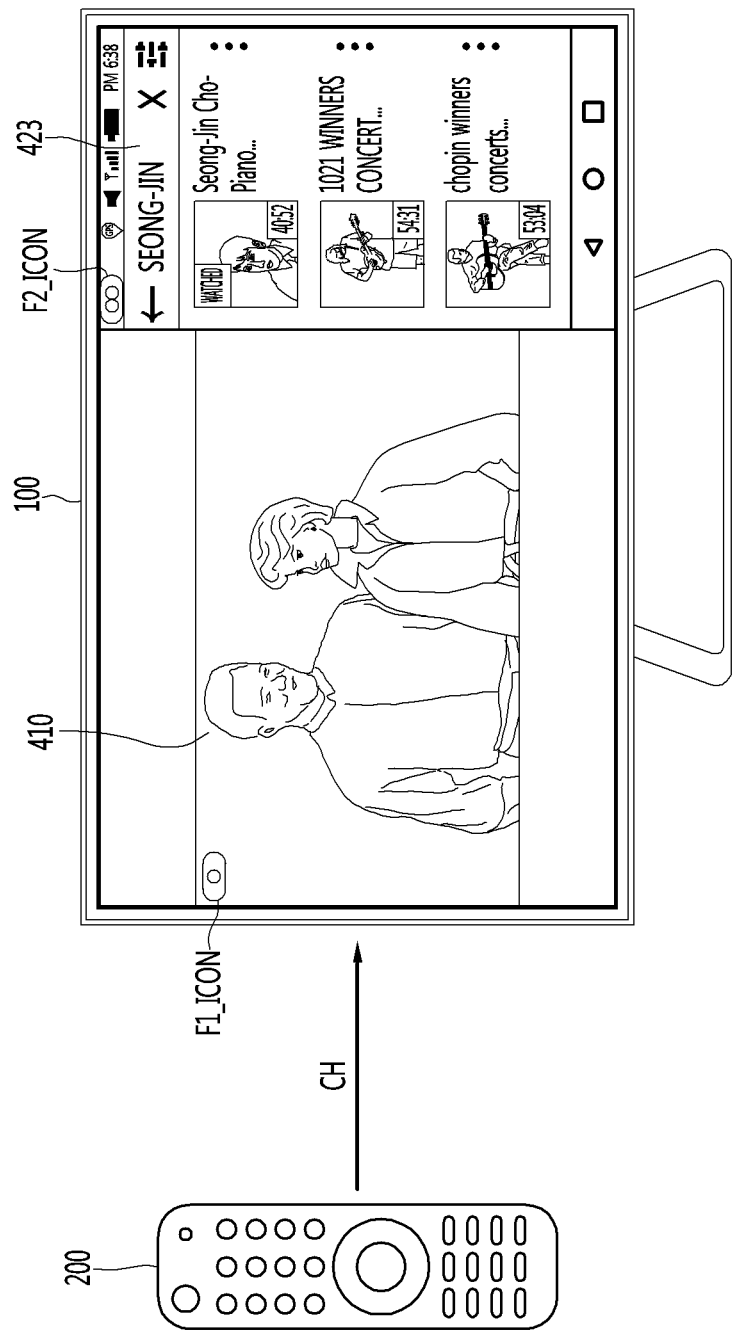
Figure 13C:
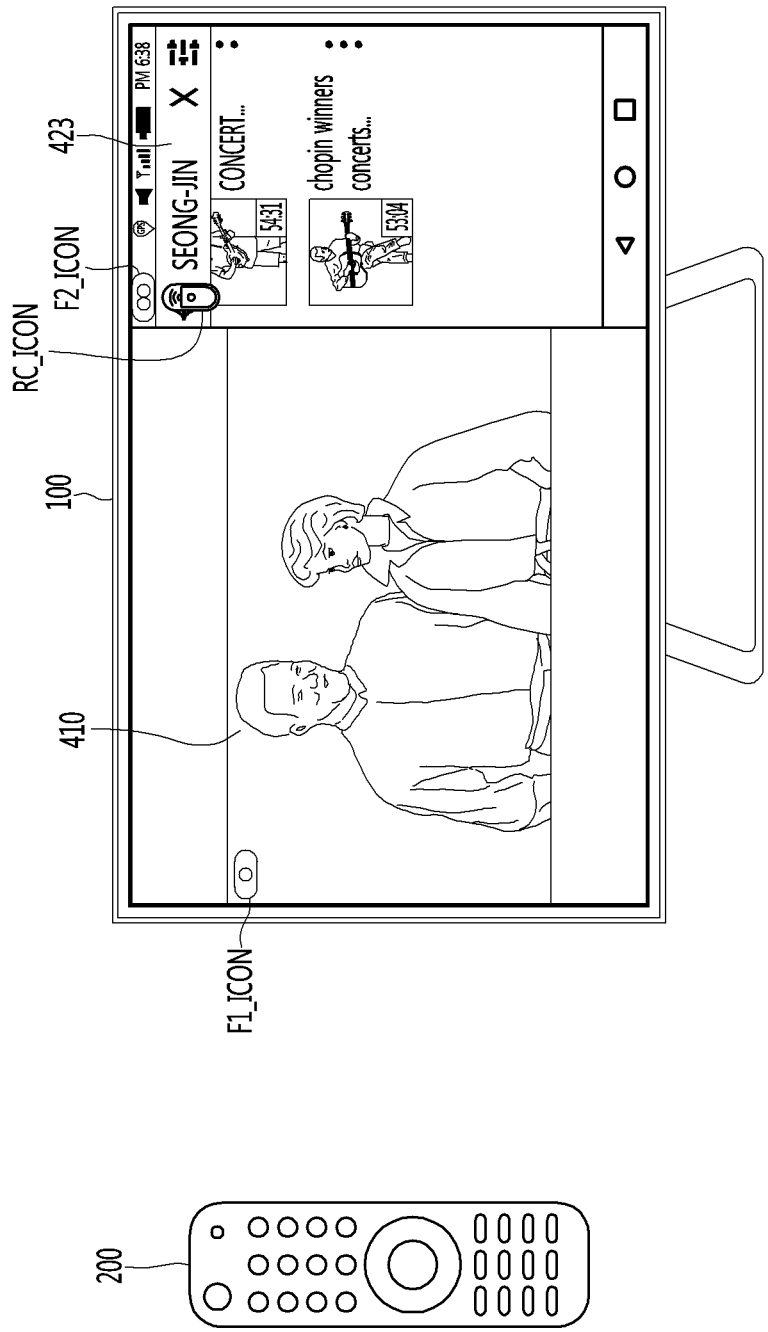

FIGS. 13A to 13C are diagrams for describing an operation of controlling a specific source device based on the input of a channel control button of a remote control device in a display device, according to an embodiment of the present invention.

Referring to FIG. 13A, the remote control device 200 may transmit a channel control button input signal CH to the display device 100 in response to the input of the channel control button 234 included in the user input unit 230.

The control unit 170 of the display device 100 may control an operation of a control-activated source device from among the source devices (the antenna and the mobile terminal), which provide content, in response to the channel control button input signal CH received from the remote control device 200.

Referring to FIG. 13B, when the control-activated source device is the antenna included in the display device 100, the control unit 170 may control an operation of the antenna or the display device 100 itself in response to the received channel control button input signal CH.

For example, when a control command of the display device 100 corresponding to the channel control button input signal CH is a channel control command, the control unit 170 may display content 414 provided from a channel which is switched according to the channel control command.

On the other hand, referring to FIG. 13C, when the control-activated source device is the mobile terminal, the control unit 170 may control an operation of the mobile terminal in response to the received channel control button input signal CH.

For example, when a control command of the mobile terminal corresponding to the channel control button input signal CH is a page scrolling command, the control unit 170 may transmit the page scrolling command to the mobile terminal. The mobile terminal may execute page scrolling on a currently-displayed screen in response to the received page scrolling command and transmit, to the display device 100, data corresponding to a screen which is changed as a result of the page scrolling. The control unit 170 may display a screen resulting from the page scrolling based on the data received from the mobile terminal.

Figure 14A:
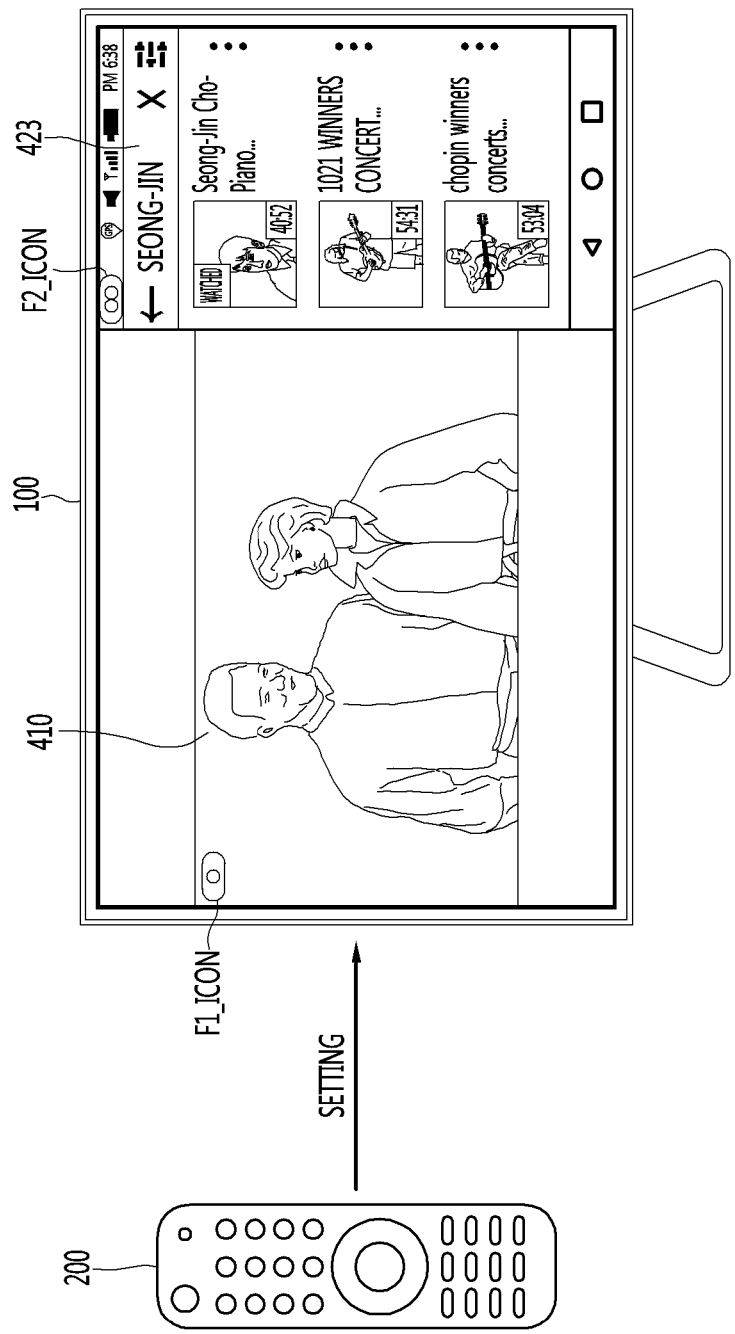
FIGS. 14A to 14C are diagrams for describing an operation of controlling a specific source device based on the input of a setting button of a remote control device in a display device, according to an embodiment of the present invention.
Figure 14B:
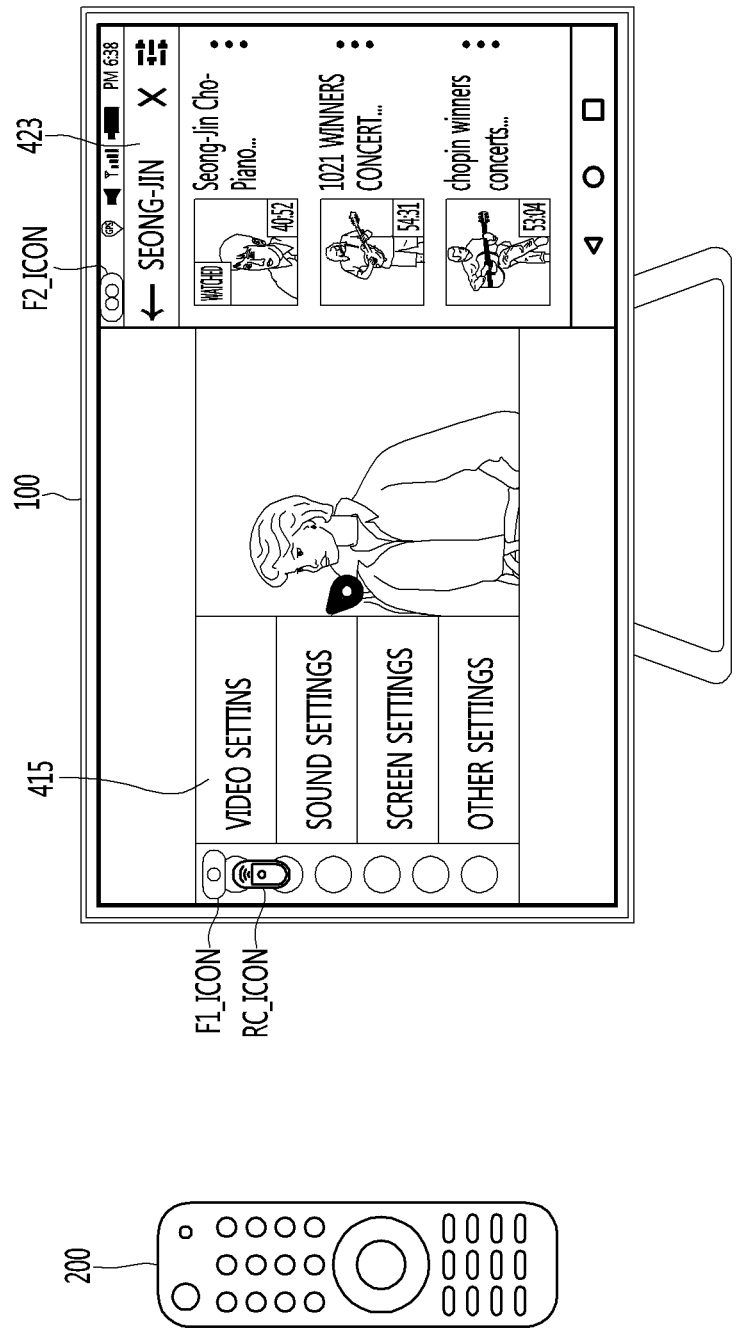
Figure 14C:
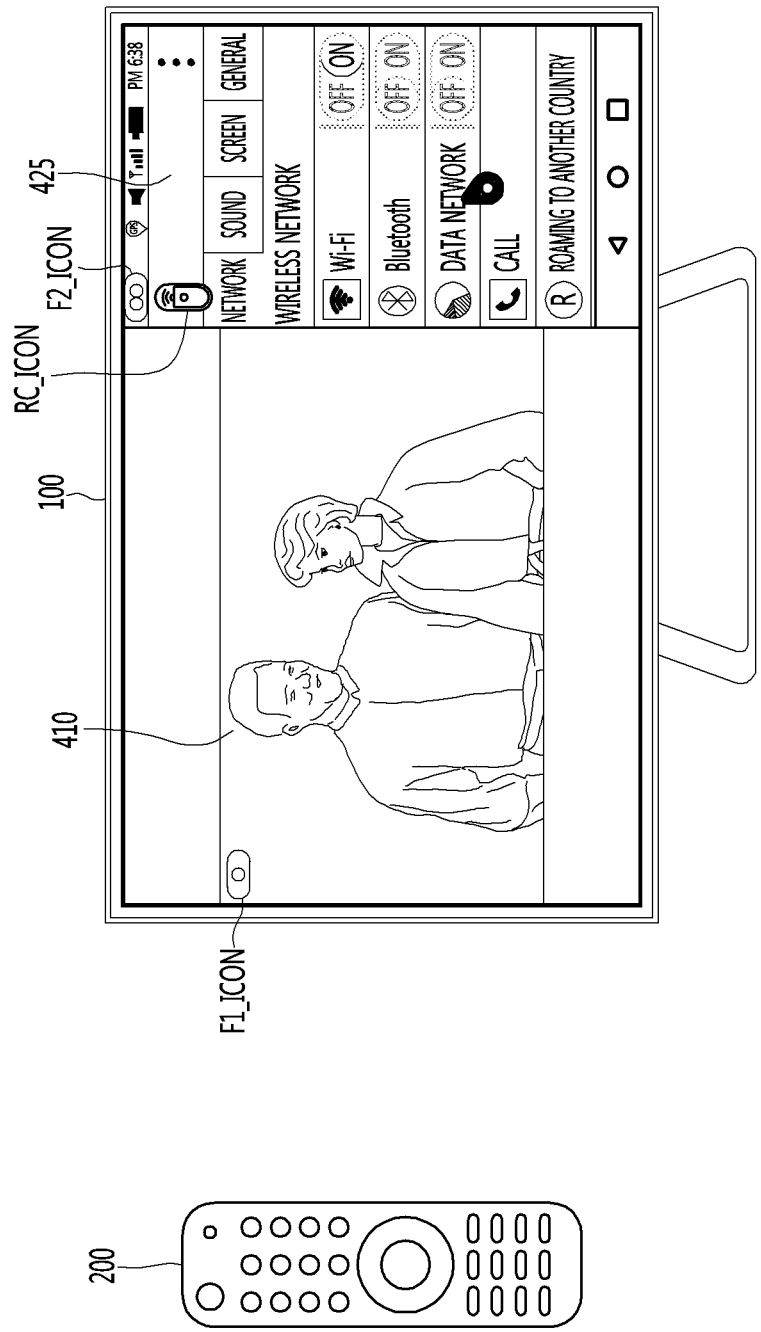

FIGS. 14A to 14C are diagrams for describing an operation of controlling a specific source device based on the input of a setting button of a remote control device in a display device, according to an embodiment of the present invention.

Referring to FIGS. 14A to 14C, the remote control device 200 may transmit a setting button input signal SETTING to the display device 100 in response to input of the setting button 238 included in the user input unit 230.

The control unit 170 of the display device 100 may execute a setting function of a control-activated source device from among the source devices (the antenna and the mobile terminal), which provide content, in response to the setting button input signal SETTING received from the remote control device 200.

As illustrated in FIG. 14B, when the control-activated source device is the antenna included in the display device 100, the control unit 170 may display a setting screen 415 of the display device 100 in response to the received setting button input signal SETTING. The control unit 170 may provide various setting functions for the display device 100 based on the displayed setting screen 415.

Also, as illustrated in FIG. 14C, when the control-activated source device is currently the mobile terminal, the control unit 170 may transmit a set application execution command for executing a set application to the mobile terminal in response to the received setting button input signal SETTING. The mobile terminal may execute the set application in response to the received set application execution command and transmit data corresponding to a screen 425 of the executed set application to the display device 100.

The control unit 170 may display the screen 425 of the set application corresponding to the received data and receive a selection request for selecting various setting menus included in the displayed screen 425 from the remote control device 100. In addition, the control unit 170 may provide the selection request to the mobile terminal, executing setting functions for the mobile terminal.

FIGS. 15A to 15D are diagrams for describing an operation of controlling a specific source device based on the input of an EXIT button of a remote control device in a display device, according to an embodiment of the present invention.

Figure 15A:
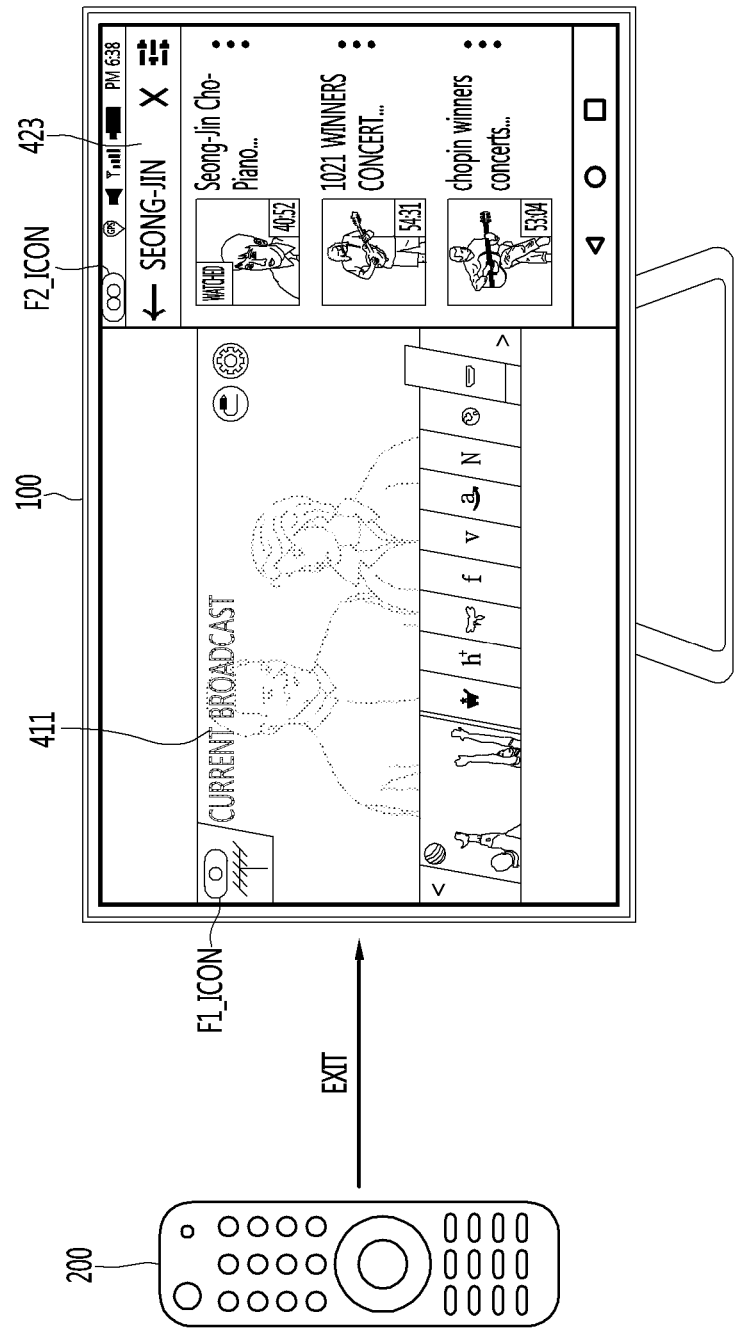

Referring to FIG. 15A, the remote control device 200 may transmit an EXIT button input signal EXIT to the display device 100 in response to input of the EXIT button 237 included in the user input unit 230. As described above with reference to FIG. 3, when the BACK button and the EXIT button are implemented by the single BACK/EXIT button 237, the control unit 280 of the remote control device 200 may transmit the BACK button input signal BACK to the display device 100 in response to a first input of the BACK/EXIT button 237 and transmit the EXIT button input signal EXIT to the display device 100 in response to a second input of the BACK/EXIT button 237.

The control unit 170 of the display device 100 may control an operation of a control-activated source device from among the source devices (the antenna and the mobile terminal), which provide content, in response to the EXIT button input signal EXIT received from the remote control device 200.

Referring to FIG. 15B, when the control-activated source device is the antenna included in the display device 100, the control unit 170 may control an operation of the antenna or the display device 100 itself in response to the received EXIT button input signal EXIT.

For example, when a control command of the display device 100 corresponding to the EXIT button input signal EXIT is a close command for closing the home screen 411 which is being displayed currently, the control unit 170 may close the home screen 411 which is being displayed and display only the content 410.

Figure 15C:
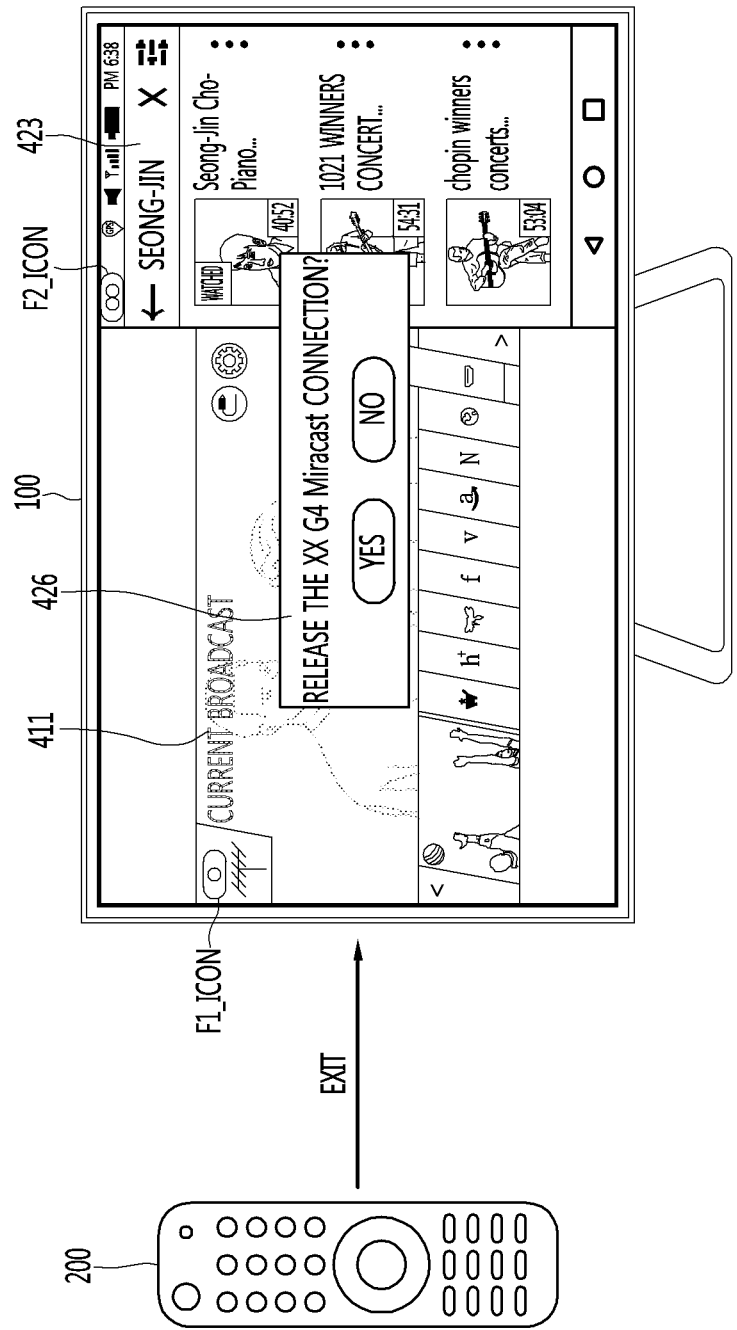

On the other hand, referring to FIGS. 15C and 15D, when the control-activated source device is the mobile terminal, the control unit 170 may control an operation of the mobile terminal in response to the received EXIT button input signal EXIT.

On the other hand, when a control command of the mobile terminal corresponding to the EXIT button input signal EXIT is a connection release command (for example, a mirroring termination command) for releasing connection with the display device 100, the control unit 170 may transmit the connection release command to the mobile terminal.

According to an embodiment, the control unit 170 may display a connection release confirmation window 426 for confirming whether to release the connection between the display device 100 and the mobile terminal, through the display unit 180, and when the connection release is confirmed through the displayed connection release confirmation window 426, transmit the connection release command to the mobile terminal.

The mobile terminal may release the connection with the display device 100 in response to the received connection release command and may transmit no data to the display device 100. Therefore, the control unit 170 may display only the content 410 provided from the antenna through the display unit 180.

Figure 16B:
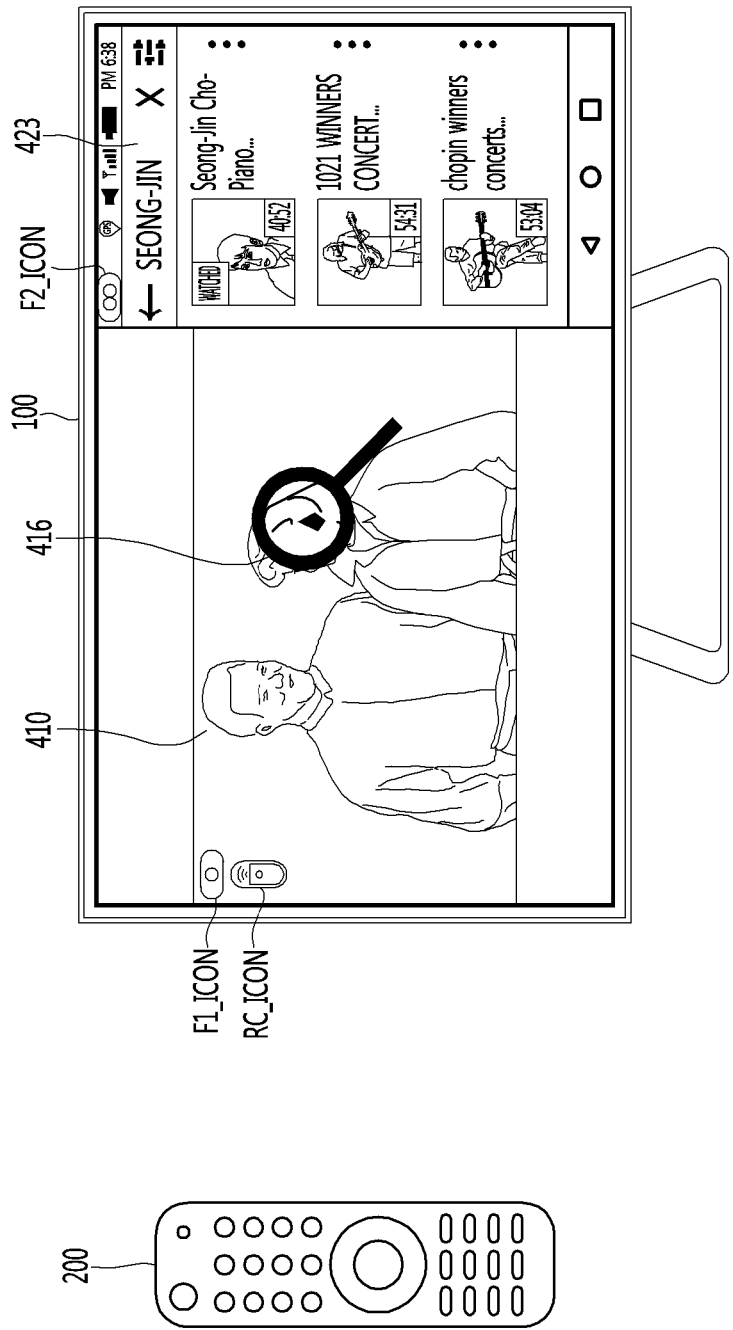

FIGS. 16A to 16C are diagrams for describing an operation of controlling a specific source device based on the input of a zoom button of a remote control device in a display device, according to an embodiment of the present invention.

Referring to FIG. 16A, the remote control device 200 may transmit a zoom button input signal ZOOM to the display device 100 in response to the input of the zoom button 239_2 included in the user input unit 230.

The control unit 170 of the display device 100 may control an operation of a control-activated source device from among the source devices (the antenna and the mobile terminal), which provide content, in response to the zoom button input signal ZOOM received from the remote control device 200.

Referring to FIG. 16B, when the control-activated source device is the antenna included in the display device 100, the control unit 170 may control an operation of the antenna or the display device 100 itself in response to the received zoom button input signal ZOOM.

For example, when a control command of the display device 100 corresponding to the zoom button input signal ZOOM is an expansion display command for expanding and displaying a part of the content 410, the control unit 170 may display a expansion display window 416 in which a part of the content 410 is expanded. Although the expansion display window 416 with the shape of a magnifying glass is illustrated in FIG. 16B, the expansion display window 416 may have various shapes.

On the other hand, referring to FIG. 16C, when the control-activated source device is the mobile terminal, the control unit 170 may control an operation of the mobile terminal in response to the received zoom button input signal ZOOM.

For example, when a control command of the mobile terminal corresponding to the zoom button input signal ZOOM is the expansion display command for expanding and displaying a part of the screen 423 of the mobile terminal, the control unit 170 may transmit the expansion display command to the mobile terminal. The mobile terminal may expand and display a part of the screen in response to the received expansion display command, and transmit data corresponding to the expanded display screen to the display device 100. The control unit 170 may display the expanded display screen as the mirroring screen 421, based on the data received from the mobile terminal. As illustrated in FIG. 16C, the mobile terminal may display the expanded display window 427 in which the part of the screen 423 is expanded according to the expansion display command on the screen 423, but is not limited thereto. The mobile terminal may expand the entire screen, a central region, or a region in which the pointer 205 is located.

FIGS. 17A to 17C are diagrams for describing an operation of controlling a specific source device based on input of a trick playback control button of a remote control device in a display device, according to an embodiment of the present invention.

Referring to FIGS. 17A to 17C, the remote control device 200 may transmit a pause button input signal PAUSE to the display device 100 in response to the input of a pause button of the trick playback control button 239_1 included in the user input unit 230.

The control unit 170 of the display device 100 may control an operation of a control-activated source device in response to the pause button input signal PAUSE received from the remote control device 200.

That is, as illustrated in FIG. 17B, when the control-activated source device is the antenna included in the display device 100, the control unit 170 may pause the playback of the content 410 in response to the received pause button input signal PAUSE. The control unit 170 may display a pause icon PAUSE_ICON1 for notifying that playback is paused. According to an embodiment, when the content 410 is content that does not support a trick playback mode (for example, live broadcast), the control unit 170 may not execute any operation even when the pause button input signal PAUSE is received.

Also, as illustrated in FIG. 17C, when the control-activated source device is the mobile terminal, the control unit 170 may transmit a pause command to the mobile terminal in response to the received pause button input signal PAUSE. The mobile terminal may pause the playback of the content 428 in response to the received pause command and transmit data corresponding to the content 426 of which the playback is paused to the display device 100.

The control unit 170 may display the content 428 of which the playback is paused as the mirroring screen, based on the received data. The control unit 170 may display a pause icon PAUSE_ICON2 for notifying that the playback of the content 428 is paused. The pause icon PAUSE_ICON2 is displayed on a screen of the mobile terminal and is then displayed on the screen of the display unit 180 as the mirroring screen. Alternatively, the pause icon PAUSE_ICON2 may be generated by the control unit 170 itself and be displayed on the mirroring screen.

According to the embodiments of FIGS. 9A to 17C, the user can selectively control the plurality of source devices by using the remote control device 200 of the display device 100 when a plurality of pieces of content provided from a plurality of source devices are displayed through the display device 100.

Next, embodiments of controlling an operation of a specific source device based on the input of a number button of a remote control device will be described with reference to FIGS. 18 to 21B.

Figure 18:
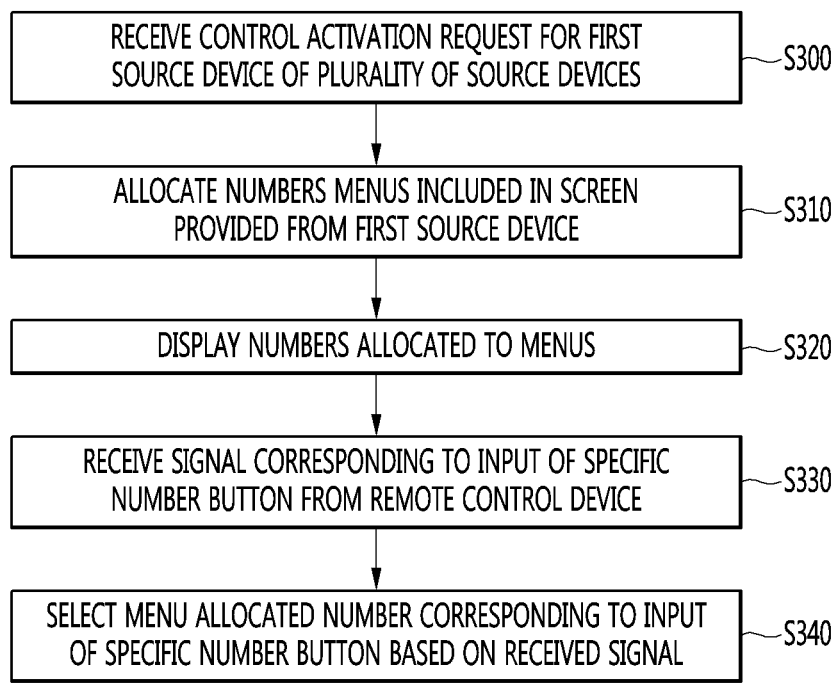
FIG. 18 is a flowchart of an operation of allocating numbers to menus included in a screen provided by a specific source device and selecting a menu based on the input of a number button of a remote control device in a display device according to embodiments of the present invention.

FIG. 18 is a flowchart for describing an operation of allocating numbers to menus included in a screen provided by a specific source device and selecting a menu based on the input of a number button of a remote control device in a display device according to embodiments of the present invention.

Referring to FIG. 18, the display device 100 may receive a control activation request for a first source device of a plurality of source devices (S300). Since step S300 is substantially identical to step S110 in FIG. 11, a detailed description thereof will be omitted.

The display device 100 may allocate numbers to menus included in a screen (or content) provided from the first source device of which the control is activated (S310).

The menus may refer to selectable menus implemented in various forms. In particular, the menus may include selectable objects, application icons, and the like.

The display device 100 may display a screen or content provided from the first source device and display numbers allocated to the menus on the corresponding menus (S320).

The display device 100 may receive a signal corresponding to the input of a specific number button from the remote control device 200 (S330), and select a menu allocated a number corresponding to the specific number button based on the received signal (S340).

Embodiments related to the operation of the display device 100 described with reference to FIG. 18 will be described below with reference to FIGS. 19A to 21B.

Figure 19A:
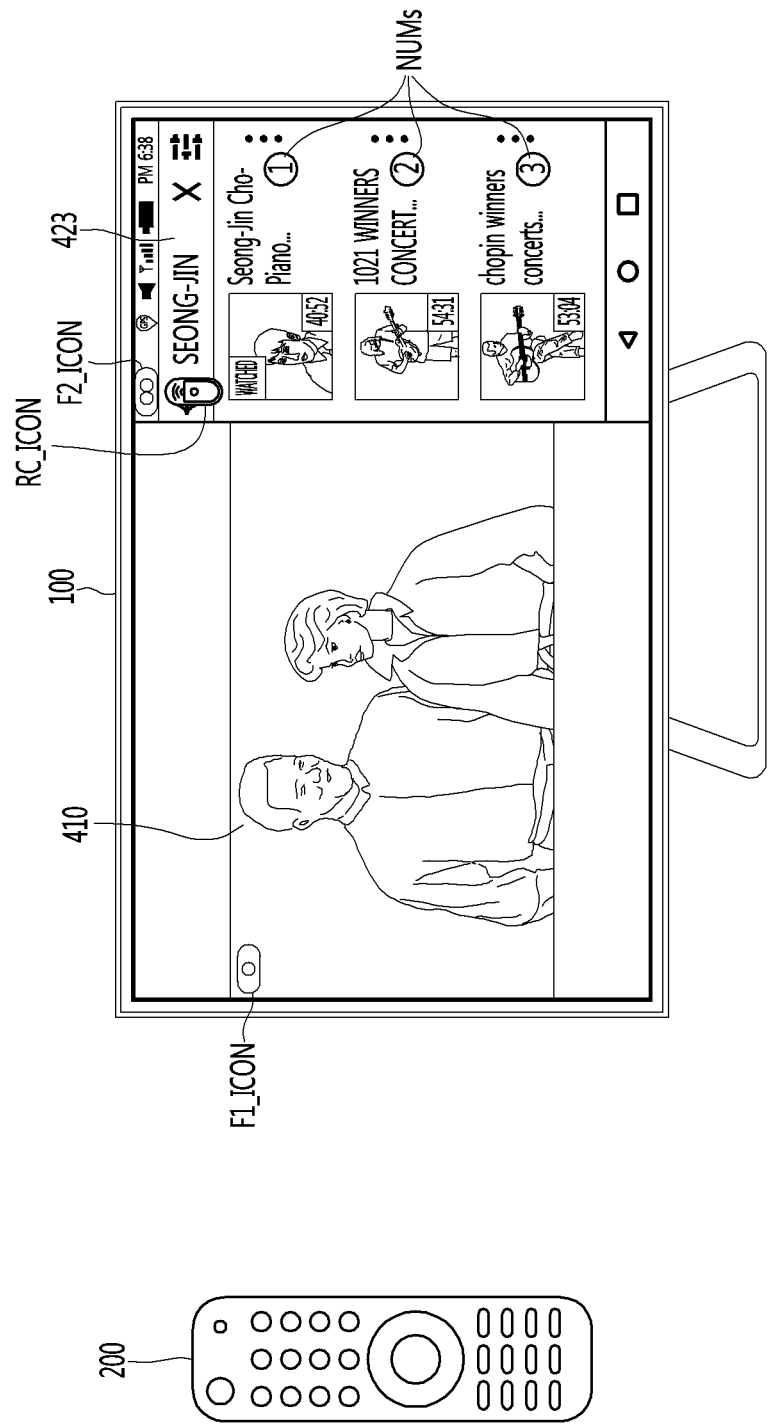
FIGS. 19A and 19B are diagrams for describing an operation of the display device illustrated in FIG. 18, according to an embodiment of the present invention.
Figure 19B:
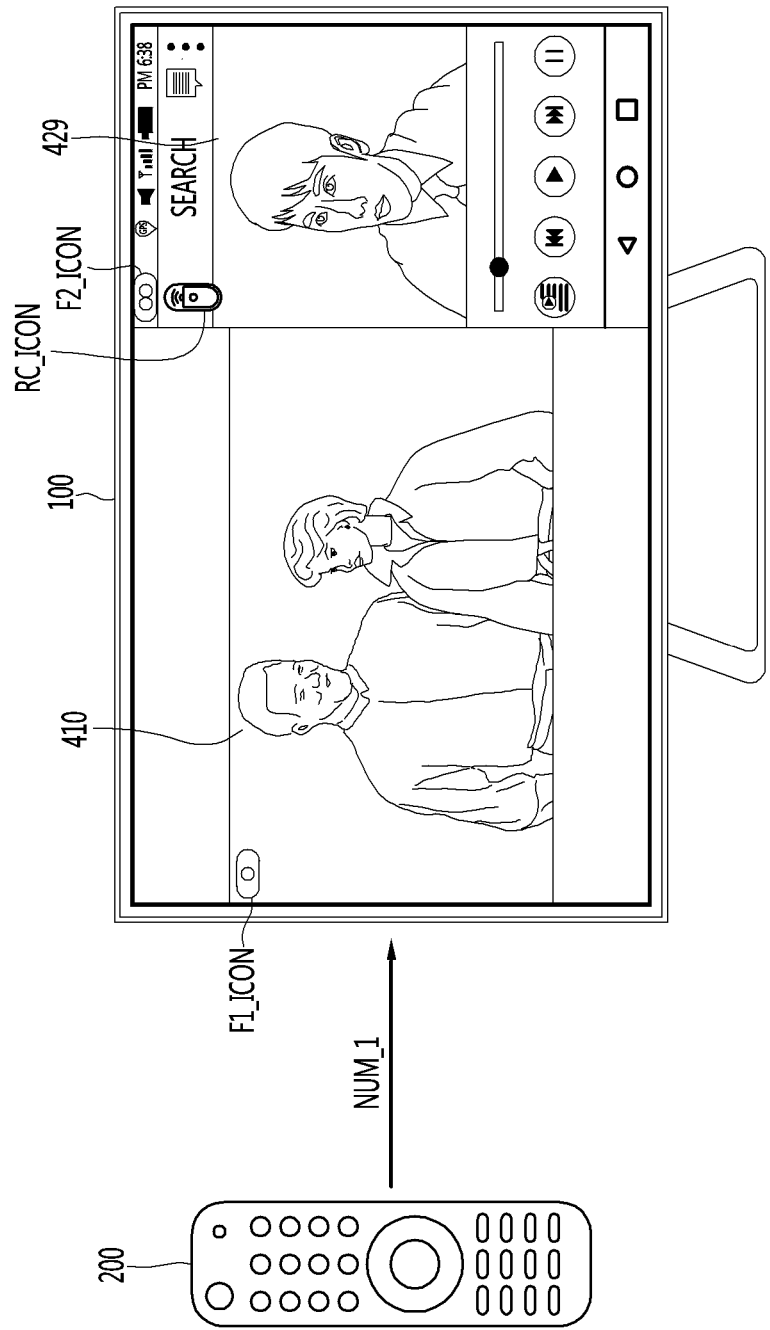

FIGS. 19A and 19B are diagrams for describing an operation of the display device illustrated in FIG. 18, according to an embodiment of the present invention.

Referring to FIG. 19A, the control unit 170 of the display device 100 may display content 410 provided from the antenna of the display device 100 and a mirroring screen 423 provided from the mobile terminal connected to the display device 100, through the display unit 180.

When a control activation request for the mobile terminal is received, the control unit 170 may activate control of the mobile terminal as described above, and display the control activation icon RC_ICON on the mirroring screen 423.

In addition, when the control of the mobile terminal is activated, the control unit 170 may allocate numbers to menus included in the mirroring screen 423 respectively. For example, as illustrated in FIG. 19A, when three video objects are included in the mirroring screen 423, the control unit 170 may allocate a number "1" to the first video object, a number "2" to the second video object, and allocate a number "3" to the third video object. The control unit 170 may display the allocated numbers NUMB on the corresponding video objects respectively.

Referring to FIG. 19B, the remote control device 200 may transmit a number button input signal NUM_1 corresponding to the number "1" to the display device 100, in response to the input of a number button corresponding to the number "1" from among the number buttons 232.

The control unit 170 may select a menu allocated the number "1" from among the menus included in the mirroring screen 423 in response to the received number button input signal NUM_1. That is, as illustrated in FIG. 19A, since the first video object on the mirroring screen 423 is allocated the number "1", the control unit 170 may transmit a selection command for selecting the first video object to the mobile terminal.

The mobile terminal may select the first video object, play back a video corresponding to the selected first video object, and transmit data corresponding to a playback screen to the display device 100, in response to the received selection command. The control unit 170 may display a playback screen corresponding to the received data as the mirroring screen 429.

Figure 20B:
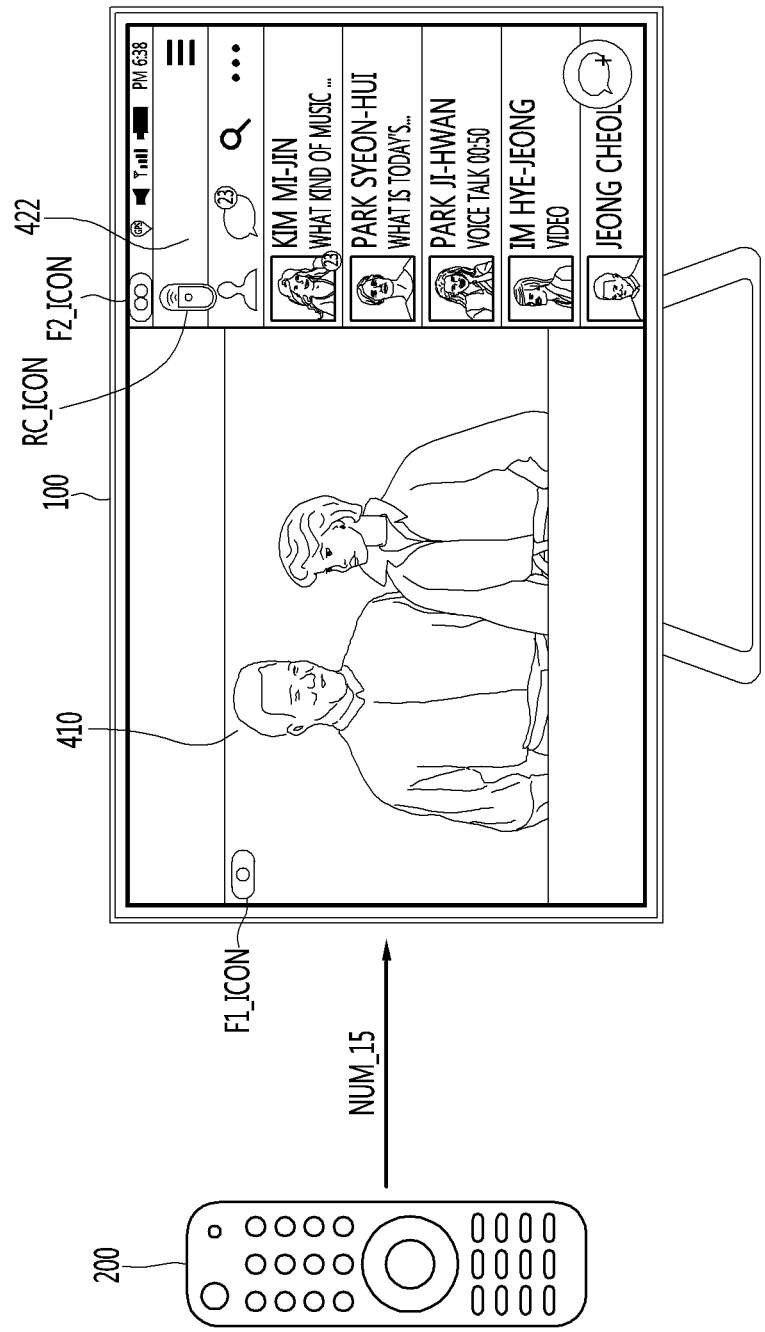

FIGS. 20A and 20B are diagrams for describing an operation of the display device illustrated in FIG. 18, according to another embodiment of the present invention.

Referring to FIG. 20A, when a plurality of icons (application icon, folder icon, and the like) are included in the mirroring screen 421 provided from the mobile terminal, the control unit 170 may allocate numbers to the plurality of icons respectively. The control unit 170 may display the allocated numbers on the corresponding icons respectively.

Referring to FIG. 20B, when buttons respectively corresponding to numbers "1" and "5" are sequentially input form among the number buttons 232, the remote control device 200 may transmit a number button input signal NUM_15 corresponding to the numbers "1" and "5" to the display device 100. The number button input signal NUM_15 transmitted by the remote control device 200 may be a single input signal representing a number "15". In the present embodiment, the number button input signal NUM_15 may represent that an input signal corresponding to the number "1" and an input signal corresponding to the number "5" are sequentially transmitted.

The control unit 170 may select a selection command for selecting an icon allocated the number "15" from among the icons included in the mirroring screen 421 to the mobile terminal in response to the received number button input signal NUM_15. As illustrated in FIG. 20B, when the icon allocated the number "15" is a messenger application icon, the mobile terminal may execute a messenger application in response to the received selection command.

The mobile terminal may transmit data corresponding to a screen of the executed messenger application to the display device 100 and the control unit 170 may display the screen of the messenger application corresponding to the received data as the mirroring screen 422.

Figure 21B:
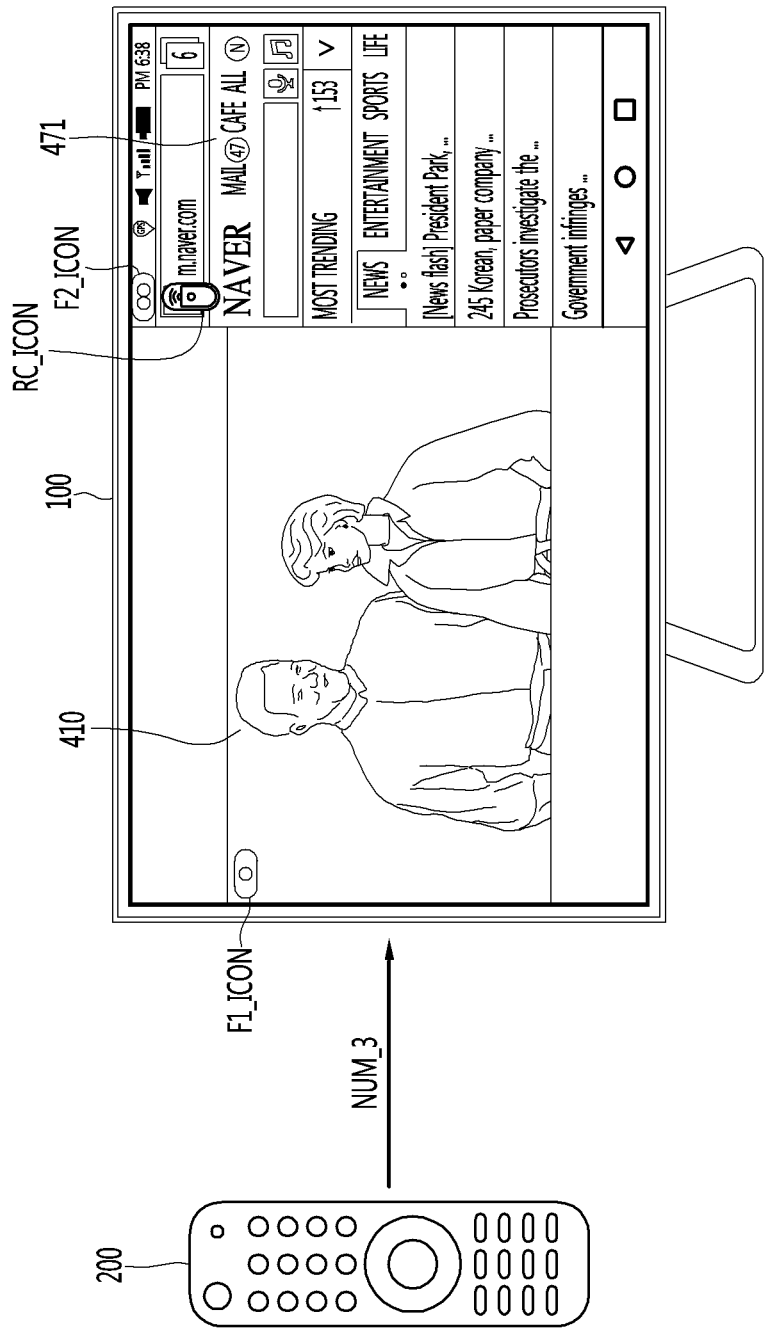

FIGS. 21A and 21B are diagrams for describing an operation of the display device illustrated in FIG. 18, according to another embodiment of the present invention.

Referring to FIG. 21A, when the mobile terminal is connected to the display device 100 and executes mirroring, the mobile terminal may provide a mirroring home screen 470. For example, when the mobile terminal is initiated to execute mirroring onto the display device 100, the mobile terminal may display the mirroring home screen 470, as an initial screen.

According to embodiments, the control unit 170 of the display device 100 may generate and provide the mirroring home screen 470. When the mirroring of the mobile terminal onto the display device 100 is initiated, the control unit 170 may generate and display the mirroring home screen 470, as an initial screen.

The mirroring home screen 470 may include a plurality of application icons. The mobile terminal or the control unit 170 may automatically set a plurality of application icons to be included in the mirroring home screen 470 based on the number of executions of each application of the mobile terminal during mirroring of the mobile terminal onto the display device 100. For example, icons of applications of which use frequencies are high when the terminal is connected to the display device 100, may be displayed on the mirroring home screen 470. According to embodiments, the plurality of application icons may be directly set by a user.

The mobile terminal or the control unit 170 of the display device 100 may allocate numbers 1 to 9 and 0 to the plurality of application icons included in the mirroring home screen 470. According to embodiments, as illustrated in FIG. 21A, the plurality of application icons included in the mirroring home screen 470 may be intuitionally arranged corresponding to the arrangement of the number buttons 232.

Referring to FIG. 21B, the remote control device 200 may transmit a number button input signal NUM_3 corresponding to a number "3" to the display device 100, in response to the input of a number button corresponding to the number "3" from among the number buttons 232.

The control unit 170 may transmit the received number button input signal NUM_3 or a selection command for selecting an application icon allocated number "3" to the mobile terminal. For example, when the mobile terminal allocates numbers to the plurality of application icons respectively, the control unit 170 may transmit the number button input signal NUM_3 to the mobile terminal. On the other hand, when the control unit 170 of the display device 100 allocates numbers to the plurality of application icons respectively, the control unit 170 may transmit a selection command for selecting an application icon allocated the number "3" to the mobile terminal.

The mobile terminal may execute an application corresponding to the application icon allocated the number "3" (for example, Internet application) in response to the received number button input signal NUM_3 or the selection command and transmit data corresponding to a screen of the executed application to the display device 100. The control unit 170 may display an application screen 471 corresponding to the received data.

That is, according to the embodiments of FIGS. 18 to 21B, the user can conveniently control the operation of a specific source device by using the number buttons of the remote control device 200.

The display device according to the embodiments of the present invention allows a user to easily select a source device to be controlled from among a plurality of source devices by using a remote control device in the case of displaying a plurality of pieces of content provided from the plurality of source devices.

Also, the display device may control the operations of various types of source devices connected to the display device based on a signal or a command received from the remote control device. In particular, it is possible to provide a method of controlling an operation of a mobile terminal connected to the display device by using the remote control device.

The invention can also be embodied as computer-readable codes on a computer-readable medium. The computer-readable medium is any recording device that can store data which can be thereafter read by a computer system. Examples of the computer-readable medium include a hard disk drive (HDD), a solid state disk (SSD), a read-only memory (ROM), a random-access memory (RAM), CD-ROMs, magnetic tapes, floppy disks, optical data storage devices, and carrier waves (such as, transmission through the Internet). Also, the computer may include the control unit 170 of the display device. Therefore, the embodiments explained above are only an illustration in every aspect and should not be limitedly interpreted. The scope of the present invention is indicated by the scope of claims and is by no means limited by the text of the specification. Further, all modifications and various improvements, substitutions, and alterations belonging to the scope of equivalents of the scope of claims are within the scope of the present invention.

What is claimed is:

1. A display device, comprising:
a display configured to simultaneously display a plurality of different content within a plurality of regions of the display; and
a controller configured to receive a control activation request for a first source device from a remote control device, activate control of the first source device in response to the received control activation request, and control an operation of the first source device in response to the signal received from the remote control device, wherein the controller is configured to:
receive a selection of a plurality of source devices, wherein one of the plurality of source devices is the first source device,
separately allocate a specific button, of a plurality of buttons at the remote control device, to each selected source device of the plurality of source devices such that each of the selected sources devices is associated with a different allocated button of the remote control device,
control the display to simultaneously display, within each separate region of the plurality of regions, content from a specific corresponding one of the source devices and an icon associated with the specific button allocated to the specific corresponding one of the source devices, wherein each one of the separate regions of the display are associated with a different one of the sources devices, each of the allocated buttons of the remote control device are allocated to one of the source devices, and each of the specific icons are displayed in each region based on the specific corresponding source device associated with the corresponding region,
receive, from the remote control device, the control activation request for the first source device of the plurality of source devices, via the allocated button for the first source device, and
in response to receiving the control activation request, control the display to display a control activation icon, indicating that control of the first source device is activated, within the region corresponding to the first source device while simultaneously displaying, within the region corresponding to the first source device, the content from the first source device and the icon associated with the specific button allocated to the first source device,
wherein default control commands respectively corresponding to the plurality of allocated buttons are deactivated during display of the plurality of different content received from the plurality of source devices.

2. The display device of claim 1, wherein the controller is configured to:
receive, from the remote control device, a signal corresponding to an input of a first allocated button of the plurality of buttons as the control activation request for the first source device, and
activate control of the first source device in response to the received signal.

3. The display device of claim 1, wherein the controller is configured to:
display a pointer corresponding to movement of the remote control device,
move a display position of the pointer based on information on the movement received from the remote control device, and
activate control of a source device which provides content displayed at the position of the pointer.

4. The display device of claim 1, wherein the controller is configured to determine a control command for the signal received from the remote control device and transmit the determined control command to the first source device, and
wherein the control command for the signal is changed depending on a type of the first source device.

5. The display device of claim 1, wherein the controller is configured to:

respectively allocate one or more numbers to one or more menus included in the content received from the first source device of which control is activated, and control the display to respectively display the one or more allocated numbers on the corresponding menus.

6. The display device of claim 5, wherein the controller is configured to:

receive a signal corresponding to input of a specific number button from the remote control device, and transmit a command for selecting a menu allocated a number corresponding to the input of the specific number button based on the received signal.

7. The display device of claim 1, wherein the controller is configured to:

display a screen for selecting a source device which is to display content, receive at least one selection request for selecting each of the plurality of source devices based on the displayed screen, and receive the different content from the plurality of source devices in response to the received at least one selection request.

8. A method of operating a display device, the method comprising:

simultaneously displaying a plurality of different content within a plurality of regions of a display;

receiving a control activation request for a first source device from a remote control device;

activating control of the first source device in response to the received control activation request; and controlling an operation of the first source device in response to the signal received from the remote control device, wherein the displaying of the plurality of different content includes:

receiving a selection of a plurality of source devices, wherein one of the plurality of source devices is the first source device, separately allocating a specific button, of a plurality of buttons at the remote control device, to each selected source device of the plurality of source devices such that each of the selected sources devices is associated with a different allocated button of the remote control device, and controlling the display to simultaneously display, within each separate region of the plurality of regions, content from a specific corresponding one of the source devices and an icon associated with the specific button allocated to the specific corresponding one of the source devices, wherein each of the separate regions of the display are associated with a different one of the sources devices, each of the allocated buttons of the remote control device are allocated to one of the different source devices, and each of the specific icons are displayed in each region based on the specific corresponding source device associated with the corresponding region, wherein the receiving of the control activation request includes:

receiving, from the remote control device, the control activation request for the first source device of the plurality of source devices, via the allocated button for the first source device, and in response to receiving the control activation request, controlling the display to display a control activation icon, indicating that control of the first source device is activated, within the region corresponding to the first source device while simultaneously displaying, within the region corresponding to the first source device, the content from the first source device and the icon associated with the specific button allocated to the first source device, wherein default control commands respectively corresponding to the plurality of allocated buttons are deactivated during display of the plurality of different content received from the plurality of source devices.

9. The method of claim 8, wherein the receiving of the control activation request comprises receiving, from the remote control device, a signal corresponding to input of a first allocated button of the plurality of buttons as the control activation request for the first source device.

10. The method of claim 8, further comprising:

displaying a pointer corresponding to movement of the remote control device;

moving a display position of the pointer based on information on the movement received from the remote control device; and activating control of a source device which provides content displayed at the position of the pointer.

11. The method of claim 8, wherein the controlling of the operation of the first source device comprises determining a control command for the signal received from the remote control device and transmitting the determined control command to the first source device, and wherein the control command for the signal is changed depending on a type of the first source device.

12. The method of claim 8, wherein the activating of the control comprises:

respectively allocating one or more numbers to one or more menus included in the content received from the first source device of which control is activated; and respectively displaying the one or more allocated numbers on the corresponding menus.

13. The method of claim 12, wherein the controlling of the operation of the first source device comprises:

receiving a signal corresponding to input of a specific number button from the remote control device; and transmitting a command for selecting a menu allocated a number corresponding to the input of the specific number button based on the received signal.

14. The method of claim 8, wherein the simultaneously displaying of the plurality of different content comprises:

displaying a screen for selecting a source device which is to display content;

receiving tat least one selection request for selecting each of the plurality of source devices based on the displayed screen;

receiving the different content from each of the plurality of source devices in response to the received at least one selection request; and displaying the plurality of different content.

* * * * *